(12) United States Patent
Kim et al.

(10) Patent No.: US 10,015,511 B2
(45) Date of Patent: Jul. 3, 2018

(54) IMAGE FRAME MOTION ESTIMATION DEVICE AND IMAGE FRAME MOTION ESTIMATION METHOD USING THE SAME

(71) Applicant: Samsung Electronics Co., Ltd., Suwon-si (KR)

(72) Inventors: Sung-jei Kim, Seoul (KR); Nyeong-kyu Kwon, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 704 days.

(21) Appl. No.: 14/454,841

(22) Filed: Aug. 8, 2014

(65) Prior Publication Data

US 2015/0055709 A1  Feb. 26, 2015

(30) Foreign Application Priority Data

Aug. 22, 2013  (KR) .......................... 10-2013-0099920

(51) Int. Cl.
*H04N 19/51* (2014.01)

(52) U.S. Cl.
CPC ................................... *H04N 19/51* (2014.11)

(58) Field of Classification Search
CPC ...................................................... H04N 19/51
See application file for complete search history.

(56) References Cited

U.S. PATENT DOCUMENTS 5,684,538 A * 11/1997 Nakaya ................... H04N 19/61
                                                                 348/699
7,027,511 B2   4/2006 Wang et al.
(Continued)

FOREIGN PATENT DOCUMENTS

JP    2009272765    11/2009
KR    100178228     11/1998
(Continued)

OTHER PUBLICATIONS

Liu, Ce, and William T. Freeman. "A high-quality video denoising algorithm based on reliable motion estimation." Computer Vision—ECCV 2010. Springer Berlin Heidelberg, 2010. 706-719.
(Continued)

*Primary Examiner* — Peter D Le
(74) *Attorney, Agent, or Firm* — Onello & Mello LLP

(57) ABSTRACT

An image frame motion estimation device and image frame motion estimation method using the same include performing first sampling for generating a first sample source block by performing first-type sampling on pixels of a source block; performing second sampling for generating a first sample reference block by performing first-type sampling on pixels of a reference block; determining a first matching region by comparing pixel values of the first sample source block and the first sample reference block; and determining a second matching region corresponding to the source block by comparing pixel values of a plurality of regions adjacent to the first matching region and the source block. Where one pixel is sampled for each block constituted by N pixels (N is a natural number) in width and M pixels (M is a natural number) in height and the sampled pixels are projected in a horizontal direction, the first-type sampling causes at least two pixels to be sampled for every M pixels or where one pixel is sampled for each block constituted by N pixels (N is a natural number) in width and M pixels (M is a natural number) in height and the sampled pixels are projected in a vertical direction, the first-type sampling causes at least two pixels to be sampled for every N pixels.

13 Claims, 18 Drawing Sheets

(56) References Cited

U.S. PATENT DOCUMENTS

| | | | |
|---|---|---|---|
| 7,627,140 B2 | 12/2009 | Chen | |
| 8,055,025 B2 | 11/2011 | Po et al. | |
| 8,107,748 B2 | 1/2012 | Miao et al. | |
| 2004/0190613 A1* | 9/2004 | Zhu | H04N 19/533 375/240.12 |
| 2004/0258154 A1* | 12/2004 | Liu | H04N 19/56 375/240.16 |
| 2005/0141616 A1* | 6/2005 | Lim | H04N 19/176 375/240.16 |
| 2006/0104482 A1* | 5/2006 | Chen | G06T 7/223 382/107 |
| 2006/0120452 A1* | 6/2006 | Li | H04N 5/145 375/240.16 |
| 2006/0268982 A1* | 11/2006 | Lee | H04N 19/563 375/240.03 |
| 2007/0121728 A1* | 5/2007 | Wang | H04N 19/563 375/240.18 |
| 2007/0258521 A1* | 11/2007 | Tsai | H04N 19/56 375/240.08 |
| 2008/0112487 A1 | 5/2008 | Park et al. | |
| 2008/0260033 A1 | 10/2008 | Austerlitz et al. | |
| 2009/0080527 A1* | 3/2009 | Zhao | H04N 19/61 375/240.16 |
| 2010/0080298 A1* | 4/2010 | Hang | H04N 19/51 375/240.16 |
| 2010/0253854 A1 | 10/2010 | Hong et al. | |
| 2011/0142366 A1* | 6/2011 | Young | G06T 3/4069 382/274 |
| 2011/0194025 A1 | 8/2011 | Chen | |
| 2011/0200107 A1* | 8/2011 | Ryu | H04N 19/61 375/240.16 |
| 2011/0206127 A1* | 8/2011 | Nguyen | H04N 5/145 375/240.16 |
| 2011/0255604 A1* | 10/2011 | Lee | H04N 19/533 375/240.16 |
| 2012/0294369 A1* | 11/2012 | Bhagavathy | H04N 19/119 375/240.16 |
| 2015/0063451 A1* | 3/2015 | Zhu | H04W 4/18 375/240.09 |

FOREIGN PATENT DOCUMENTS

| | | |
|---|---|---|
| KR | 100578682 | 5/2006 |
| WO | 0232145 | 4/2002 |

OTHER PUBLICATIONS

Dane and Nguyen, Optimal Temporal Interpolatin Filter for Motion-Compensated Frame Rate Up Conversion, IEEE Transactions on Image Processing, vol. 15, No. 4, Apr. 2006, pp. 978-991.

Mersereau, The Processing of Hexagonally Sampled Two-Dimensional Signals, Proceedings of the IEEE, vol. 67, No. 6, Jun. 1979, pp. 930-949.

* cited by examiner

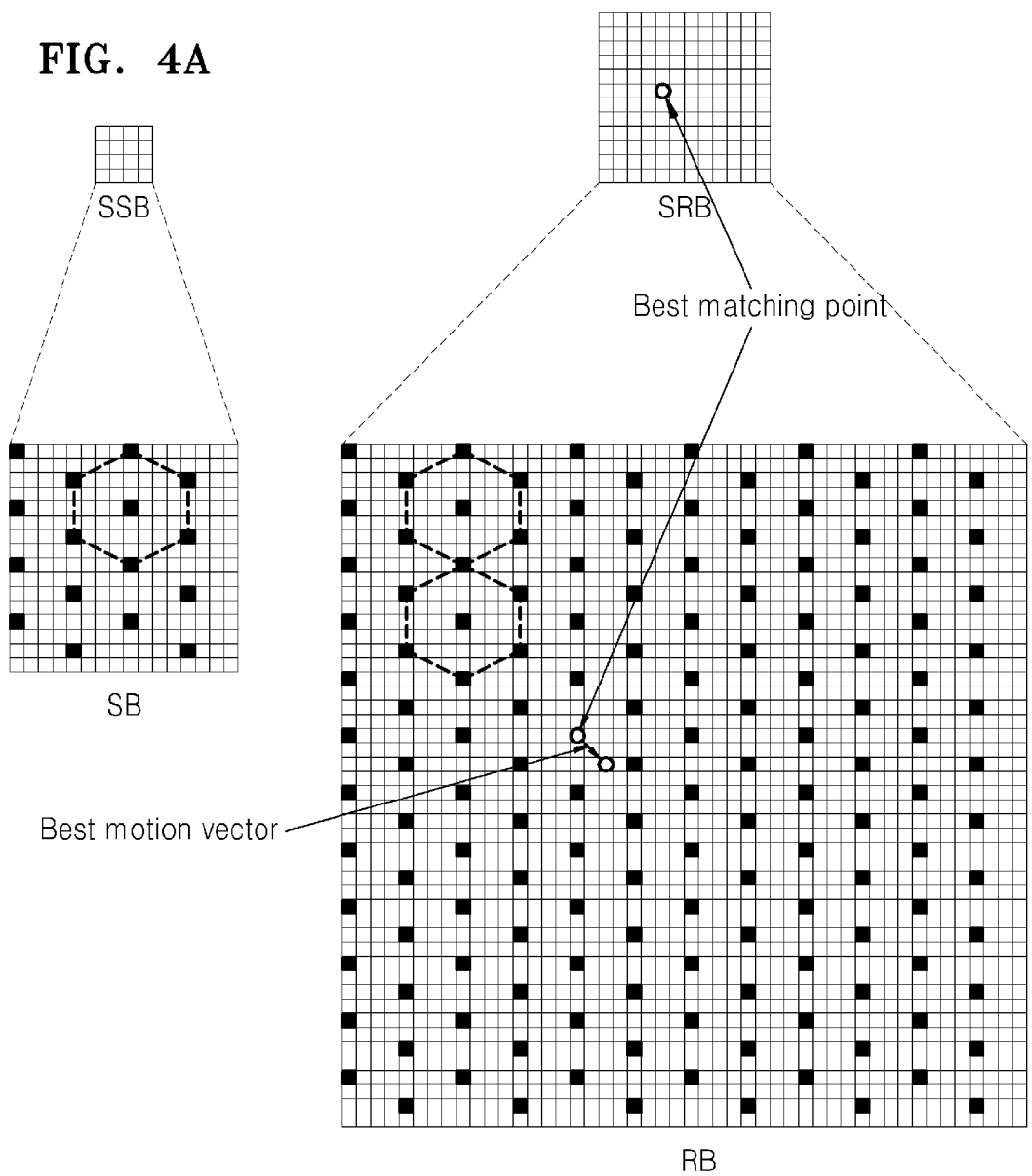

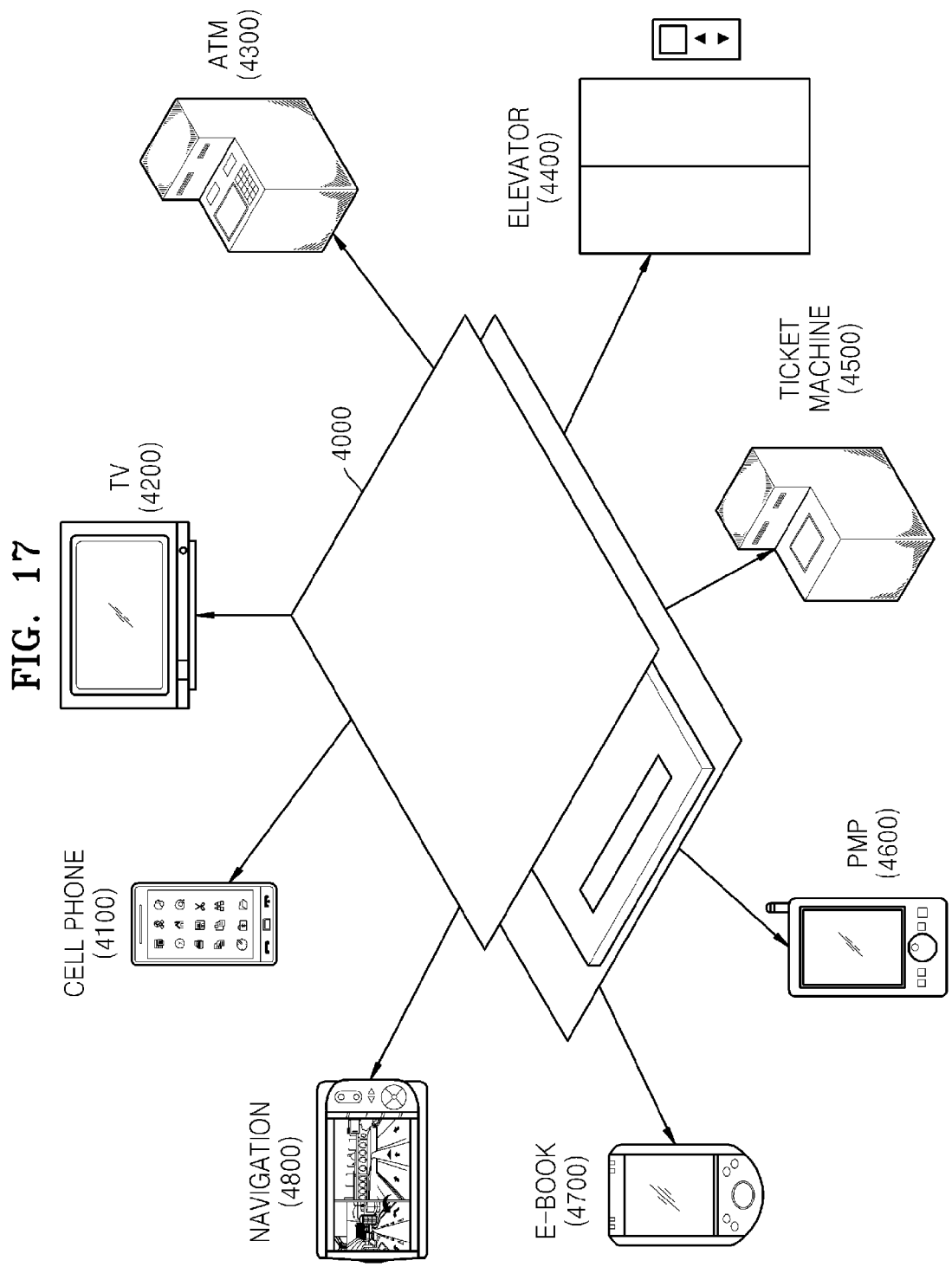

IMAGE FRAME MOTION ESTIMATION DEVICE AND IMAGE FRAME MOTION ESTIMATION METHOD USING THE SAME

CROSS-REFERENCE TO RELATED APPLICATIONS

This U.S. non-provisional application claims priority under 35 U.S.C. § 119 Korean Patent Application No. 10-2013-0099920, filed on Aug. 22, 2013, in the Korean Intellectual Property Office, the contents of which are herein incorporated by reference in their entirety.

BACKGROUND

Embodiments of the present inventive concepts relate to an image frame motion estimation device and an image frame motion estimation method using the same. More particularly, the embodiments of the present inventive concepts relate to a device and method for estimating a motion of an object of an image frame.

In the communication field in which bandwidth is limited, image signal compression is important in realizing a multimedia application. An object of the image signal compression is to remove a redundant image signal and to extract only core information used to reproduce an image. In particular, in video signal compression, an important premise for removing a redundant video signal is that there is little difference between two adjacent frames in a video sequence.

Accordingly, in a codec such as MPEG-4 or H.264/MPEG-4 advanced video coding (AVC), in order to predict a motion vector of a current block, various methods using information of current blocks and previous blocks have been used.

Hierarchical motion estimation has an advantage that a motion of an object of an image frame can be rapidly ascertained at a low computational complexity. Another advantage of hierarchical motion estimation is that a memory with a small capacity is required. However, the hierarchical motion estimation has a disadvantage that there is a possibility that a motion of an object is not exactly ascertained.

SUMMARY

The embodiments of the inventive concepts provide a device and method for estimating a motion of an object of an image frame.

According to an aspect of the present inventive concepts, there is provided an image frame motion estimation method including: performing first sampling for generating a first sample source block by performing first-type sampling on pixels of a source block; performing second sampling for generating a first sample reference block by performing first-type sampling on pixels of a reference block; determining a first matching region by comparing pixel values of the first sample source block and the first sample reference block; and determining a second matching region corresponding to the source block by comparing pixel values of the source block and the reference block in a plurality of regions adjacent to the first matching region. Where one pixel is sampled for each block constituted by N pixels (N is a natural number) in width and M pixels (M is a natural number) in height and the sampled pixels are projected in a horizontal direction, the first-type sampling causes at least two pixels to be sampled for every M pixels or where one pixel is sampled for each block constituted by N pixels (N is a natural number) in width and M pixels (M is a natural number) in height and the sampled pixels are projected in a vertical direction, the first-type sampling causes at least two pixels to be sampled for every N pixels.

In some embodiments, the image frame motion estimation method may further include determining a motion vector between the reference block and the source block through the second matching region.

In some embodiments, the determining of the first matching region may include: matching a first pixel of the first sample source block with each pixel and obtaining a sum of differences between pixel values with respect to a portion where the first sample source block and the first sample reference block overlap each other; and determining a first matching region in the reference block having a minimum sum of differences between the pixel values.

In some embodiments, the determining of the second matching region may include: matching a second pixel of the source block with each pixel of the reference block in a plurality of regions adjacent to the first matching region, and obtaining a sum of differences between pixel values with respect to a portion where the source block and the reference block overlap each other; and determining a second matching region in the reference block having a minimum sum of differences between the pixel values.

In some embodiments, the first-type sampling may be sampling in which a connecting line of sampled pixels is a straight line in a horizontal direction or a vertical direction.

In some embodiments, a sampling type of the first-type sampling may be determined by comparing pixel values of the source block and the reference block which pass through a horizontal sobel filter and a vertical sobel filter.

In some embodiments, when a sum of the pixel values of the source block and the reference block which pass through the horizontal sobel filter is greater than a sum of the pixel values of the source block and the reference block which pass through the vertical sobel filter, the first-type sampling may be a first-type hexagonal system sampling which is sampling in which a connecting line of sampled pixels is a straight line in a vertical direction. When a sum of the pixel values of the source block and the reference block which pass through the horizontal sobel filter is less than a sum of the pixel values of the source block and the reference block which pass through the vertical sobel filter, the first-type sampling may be a first-type hexagonal system sampling which is sampling in which a connecting line of sampled pixels is a straight line in a horizontal direction.

In some embodiments, the image frame motion estimation method may further include performing third sampling for generating a second sample source block by performing second-type sampling having a different directivity from the first-type sampling on pixels of the source block; performing fourth sampling for generating a second sample reference block by performing second-type sampling on pixels of the reference block; obtaining a third matching point in the reference block by comparing the second sample source block and the second sample reference block; and obtaining a fourth matching point by comparing the source block and the reference block in a vicinity of the third matching point.

In some embodiments, the image frame motion estimation method may further include obtaining a motion vector between the reference block and the source block by comparing a second matching point and the fourth matching point.

In some embodiments, the first-type sampling and the second-type sampling may include sampling pixels so that a connecting line of sampled pixels is a straight line in a horizontal direction in the source block and the reference block, or sampling pixels so that the connecting line of sampled pixels is a straight line in a vertical direction in the source block and the reference block.

According to another aspect of the present inventive concepts, there is provided an image frame motion estimation device including: a sampling unit for performing first-type sampling on pixels of a source block to generate a first sample source block, and performing first-type sampling on pixels of a reference block to generate a first sample reference block; a first comparison unit for determining a first matching region by comparing pixel values of the first sample source block and the first sample reference block; and a second comparison unit for determining a second matching region corresponding to the source block by comparing pixel values of the source block and the reference block in a plurality of regions adjacent to the first matching region. Where one pixel is sampled for each block constituted by N pixels (N is a natural number) in width and M pixels (M is a natural number) in height and the sampled pixels are projected in a horizontal direction, the first-type sampling causes at least two pixels to be sampled for every M pixels or where one pixel is sampled for each block constituted by N pixels (N is a natural number) in width and M pixels (M is a natural number) in height and the sampled pixels are projected in a vertical direction, the first-type sampling causes at least two pixels to be sampled for every N pixels.

In some embodiments, the image frame motion estimation device may further include a motion vector calculation unit for determining a motion vector between the reference block and the source block through the second matching region.

In some embodiments, the first comparison unit may match a first pixel of the first sample source block with each pixel and obtains a sum of differences between pixel values with respect to a portion where the first sample source block and the first sample reference block overlap each other. The first comparison unit may determine a first matching region in the reference block having a minimum sum of differences between the pixel values.

In some embodiments, the second comparison unit may match a second pixel of the source block with each pixel of the reference block in a plurality of regions adjacent to the first matching region, and may obtain a sum of differences between pixel values with respect to a portion where the source block and the reference block overlap each other. The second comparison unit may determine a second matching region in the reference block having a minimum sum of differences between the pixel values.

In some embodiments, the sampling unit may perform second-type sampling having a different directivity from the first-type sampling on pixels of the source block to generate a second sample source block, and may perform second-type sampling on pixels of the reference block. The first comparison unit may obtain a third matching point in the reference block by comparing the second sample source block and the second sample reference block. The second comparison unit may obtain a fourth matching point by comparing the source block and the reference block in a vicinity of the third matching point.

According to another aspect of the present inventive concepts, there is provided an image frame motion estimation method including performing first sampling for generating a first sample source block by performing first-type sampling on pixels of a source block, performing second sampling for generating a first sample reference block by performing first-type sampling on pixels of a reference block, determining a first matching region by comparing pixel values of the first sample source block and the first sample reference block, and determining a second matching region corresponding to the source block by comparing pixel values of the source block and the reference block in a plurality of regions adjacent to the first matching region. When one pixel is sampled for each block constituted by 2K pixels (K is a natural number) in width and height and when a pixel sampled in at least one of the horizontal and vertical directions is projected, one pixel may be sampled for every K pixel.

In some embodiments, the method further includes determining a motion vector between the reference block and the source block through the second matching region.

In some embodiments, the determining of the first matching region includes matching a first pixel of the first sample source block with each pixel and obtaining a sum of differences between pixel values with respect to a portion where the first sample source block and the first sample reference block overlap each other, and determining a first matching region in the reference block having a minimum sum of differences between the pixel values.

In some embodiments, the determining of the second matching region includes matching a second pixel of the source block with each pixel of the reference block in a plurality of regions adjacent to the first matching region, and obtaining a sum of differences between pixel values with respect to a portion where the source block and the reference block overlap each other, determining a second matching region in the reference block having a minimum sum of differences between the pixel values.

In some embodiments, the first-type sampling is sampling in which a connecting line of sampled pixels is a straight line in a horizontal direction or a vertical direction.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

FIGS. 4A and 4B are diagrams illustrating hexagonal system sampling of a source block and a reference block, according to an example embodiment of the present inventive concepts.

FIG. 17 is a diagram of application examples of various electronic products to which a display device including an image frame motion estimation device according to an example embodiment of the present inventive concepts is mounted.

DETAILED DESCRIPTION OF THE EMBODIMENTS

Figure 1:
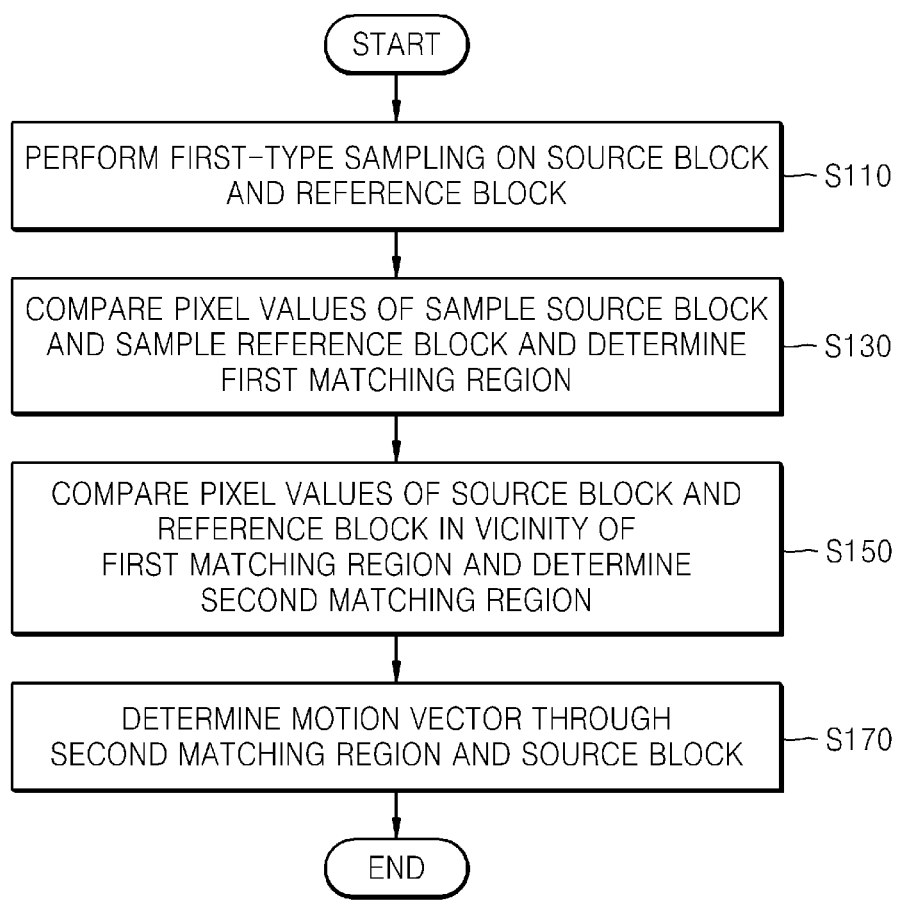
FIG. 1 is a flowchart of a method of encoding an image frame according to an example embodiment of the present inventive concepts.

Various example embodiments will now be described more fully hereinafter with reference to the accompanying drawings, in which some example embodiments of the present inventive concepts are shown. The present inventive concepts may, however, be embodied in many different forms and should not be construed as limited to the example embodiments set forth herein The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

FIG. 1 is a flowchart of a method of estimating a motion of an image frame, according to an example embodiment of the present inventive concepts.

Referring to FIG. 1, the method of estimating the motion of the image frame, according to the example embodiment of the present inventive concepts, includes generating a sample source block by performing first-type sampling, for example, hexagonal system sampling, on pixels of a source block and generating a sample reference block by, for example, performing hexagonal system sampling on pixels of a reference block (S110). The method of estimating the motion of the image frame further includes comparing pixel values of the sample source block and the sample reference block and determining a first matching region in the reference block corresponding to the source block (S130). The method of estimating the motion of the image frame further includes comparing pixel values between the source block and the reference block in a region within a fixed distance from a first matching region and determining a second matching region (operation S150). The method of estimating the motion of the image frame further includes determining a motion vector through the second matching region and the source block (S170).

The first-type sampling may be, for example, where at least two pixels are sampled for every M pixels, when one pixel is sampled for each block constituted by N pixels (N is a natural number) in width and M pixels (M is a natural number) in height and the sampled pixels are projected in a horizontal direction. The first-type sampling may be, for example, where at least two pixels are sampled for every N pixels when one pixel is sampled for each block constituted by N pixels (N is a natural number) in width and M pixels (M is a natural number) in height and the sampled pixels are projected in a vertical direction, which will be described in detail below with reference to FIGS. 4A-B, 5A-C, and 14A-D.

The hexagonal system sampling may include, for example, performing sampling so that a line connecting pixels to be sampled in the first-type sampling has a hexagonal shape.

In a method of encoding an image frame according to an example embodiment of the inventive concepts, first-type sampling is performed on a source block and a reference block so that a relatively small number of sampling operations may be performed, and a high sampling frequency may be obtained in a horizontal or vertical direction.

Figure 2:
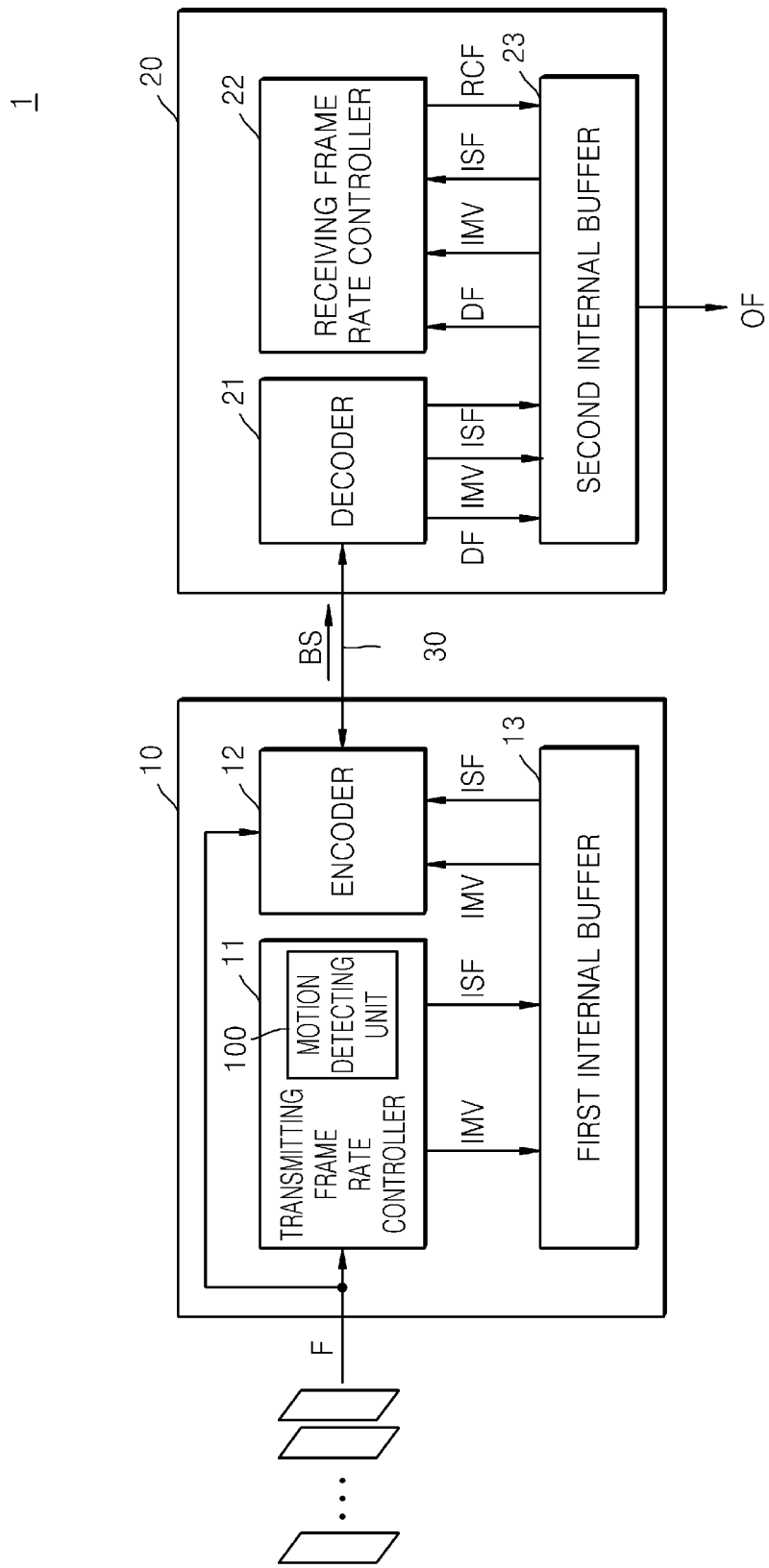
FIG. 2 is a block diagram of an image signal transmission and reception system according to an example embodiment of the present inventive concepts.

FIG. 2 is a block diagram of an image signal transmission and reception system 1 according to an example embodiment of the present inventive concepts. Referring to FIG. 2, the image signal transmission and reception system 1 includes an image frame encoding device 10 and a bit stream decoding device 20.

The image frame encoding device 10 encodes image frames F to be input to generate bit streams BS. An encoder 12 transmits data in units of bit streams. The generated bit streams BS are transmitted to the bit stream decoding device 20. The bit stream decoding device 20 decodes the bit streams BS to generate output image frames OF.

An image display device receiving the output image frames OF may display an image depending on the output image frames OF.

The image frame encoding device 10 includes a transmitting frame rate controller 11, the encoder 12, and a first internal buffer 13.

The transmitting frame rate controller 11 receives the image frames F. The transmitting frame rate controller 11 generates pieces of information of a motion vector IMV and pieces of information of a source frame ISF on the basis of the image frames F. Specifically, a motion vector estimation device 100 included in the transmitting frame rate controller 11 generates the information of the motion vector IMV.

The image frames F are constituted by a reference frame and a source frame. In the information of the motion vector IMV, the reference frame includes motion information between motion objects included in the source frame. The information of the motion vector IMV and the information of the source frame ISF are transmitted to the first internal buffer 13.

The encoder 12 receives the image frames F. In addition, the encoder 12 receives the information of the motion vector IMV and the information of the source frame ISF from the first internal buffer 13. The encoder 12 may distinguish between the source frame and the reference frame in the received image frames F. When the information of the motion vector IMV and the information of the source frame ISF are received, the encoder 12 encodes the reference frame and the information of the motion vector IMV, and generates the bit streams BS.

For example, the encoder 12 may convert image data of the image frames F from a spatial domain to another domain such as a frequency domain. For example, the encoder 12 may quantize each of the image frames F. For example, the encoder 12 may be an entropy encoder. The entropy encoder may use context adaptive variable length coding (CAVLC). For example, the encoder 12 may perform encoding in accordance with compression standards of an image frame such as MPEG-1, MPEG-2, MPEG-4, H.263, or H.264. Quantized data, data converted into another domain rather than a spatial domain, compressed data, or a combination thereof may be used as the encoded data.

The transmitting frame rate controller 11 provides the information of the source frame ISF to the firsts internal buffer 13 which provides the information of the source frame ISF to the encoder 12. The encoder 12 does not encode an image frame, that is, a source frame, which corresponds to the information of the source frame ISF. The encoder 12 encodes an alternative frame, instead of encoding the image frame corresponding to the information of the source frame ISF. The alternative frame includes information on a difference in pixel values between the source frame and the reference frame. The transmitting frame rate controller 11 provides the information of the motion vector IMV used to restore the source frame in a receiving frame rate controller 22 in the bit stream decoding device 20 receiving the bit streams BS.

The motion vector estimation device 100 of FIG. 2 according to the example embodiment of the present inventive concepts may use first-type sampling, for example, hexagonal system sampling, in calculating a motion vector. The first-type sampling, for example, hexagonal system sampling, will be described in detail below with reference to FIGS. 4A-B, 5A-C, and 14A-D. Unlike orthogonal system sampling, in the hexagonal system sampling, a relatively small number of sampling operations may be performed, and a high sampling frequency may be obtained in a horizontal or vertical direction.

The first internal buffer 13 temporarily stores the information of the motion vector IMV and the information of the source frame ISF that are received from the transmitting frame rate controller 11. The first internal buffer 13 provides the information of the motion vector IMV and the information of the source frame ISF to the encoder 12.

The bit streams BS are transmitted to the bit stream decoding device 20 through a network 30. The network 30 may be at least one of a cable, an optical fiber, and a wireless communication system. When the network 30 is a wireless communication system, the network 30 may be a communication system that uses any one of code division multiple access (CDMA), wideband CDMA (WCDMA), frequency division multiple access (FDMA), orthogonal FDMA (OFDMA), global system for mobile communication (GSM), enhanced data GSM environment (EDGE), general packet radio service (GPRS), and terrestrial trunked radio (TETRA), or a combination thereof.

The bit stream decoding device 20 includes a decoder 21, a receiving frame rate controller 22, and a second internal buffer 23.

The decoder 21 decodes the bit streams BS and generates image frames DF, the information of the motion vector IMV, and the information of the source frame ISF which are decoded. The decoded image frames DF, the information of the motion vector IMV, and the information of the source frame ISF are stored in the second internal buffer 23.

The receiving frame rate controller 22 receives the decoded image frames DF, the information of the motion vector IMV, and the information of the source frame ISF from the second internal buffer 23. The receiving frame rate controller 22 generates a restoration frame RCF by using the information of the motion vector IMV. The restoration frame RCF may include the same image information as the source frame. The receiving frame rate controller 22 may replace an alternative frame stored in the second internal buffer 23 with the restoration frame RCF and store the restoration frame RCF.

The second internal buffer 23 stores the decoded image frames DF, the information of the motion vector IMV, and the information of the source frame ISF. The second internal buffer 23 provides the decoded image frames DF, the information of the motion vector IMV, and the information of the source frame ISF to the receiving frame rate controller 22. The second internal buffer 23 stores the restoration frame RCF received from the receiving frame rate controller 22.

For example, the first and second internal buffers 13 and 23 may be constituted by one of static random access memory (SRAM), dynamic RAM (DRAM), synchronous DRAM (SDRAM), electrically erasable and programmable ROM (EEPROM), a flash memory device, phase-change RAM (PRAM), magnetic RAM (MRAM), resistive RAM (RRAM), ferroelectric RAM (FRAM), and a hard disk drive (HDD), or a combination thereof.

Figure 3:
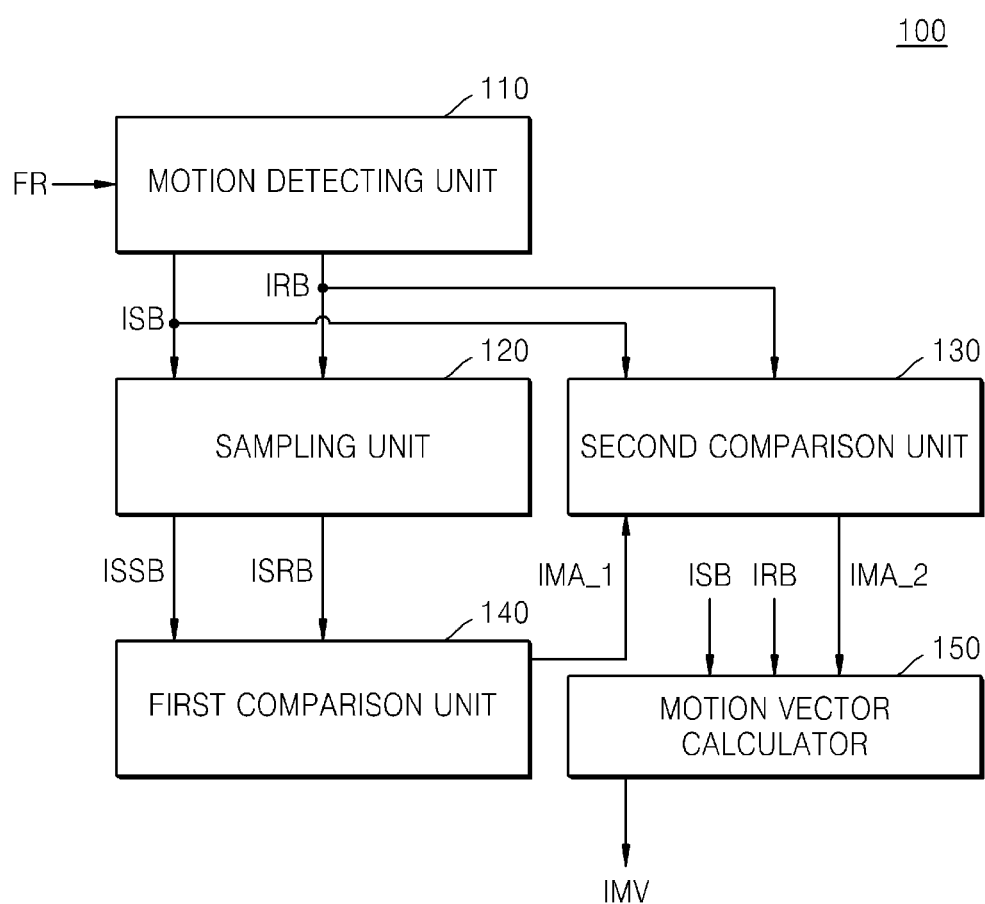
FIG. 3 is a block diagram illustrating a motion vector estimation device according to an example embodiment of the present inventive concepts.

FIG. 3 is a block diagram of the motion vector estimation device 100 according to an example embodiment of the present inventive concepts.

Referring to FIG. 3, the motion vector estimation device 100 may include a motion detecting unit 110, a sampling unit 120, a second comparison unit 130, a first comparison unit 140, and a motion vector calculator 150.

The motion detecting unit 110 may continuously receive frames FR. The motion detecting unit 110 may determine whether a motion occurs in an object of a current frame by using the current frame as a source frame and by using a previous frame as a reference frame. In addition, the motion detecting unit 110 may set a portion of the source frame in which a motion is detected as a source block SB and set a portion of the reference frame corresponding thereto as a reference block RB. The motion detecting unit 110 may generate information of the source block ISB and information of the reference block IRB and transmit the generated information of the source block ISB and the information of the reference block IRB to the sampling unit 120 and the second comparison unit 130.

The sampling unit 120 may receive the information of the source block ISB and the information of the reference block IRB and sample the source block SB and the reference block RB. The sampling unit 120 will be described below with reference to FIGS. 4A-B and 5A-C.

FIGS. 4A and 4B are diagrams illustrating hexagonal system sampling of a source block and a reference block, according to an example embodiment of the present inventive concepts.

Referring to FIG. 4A, the source block includes 16×16 pixels; however, the present inventive concepts are not limited thereto. It is assumed that an upper leftmost pixel coordinate of the source block is (1,1), for example, (column, row). For example, in the case of first hexagonal system sampling, a 4×4 sample source block SSB may be generated by sampling (1, 1), (1, 5), (1, 9), (1, 13), (5, 3), (5, 7), (5, 11), (5, 15), (9, 1), (9, 5), (9, 9), (9, 13), (13, 3), (13, 7), (13, 11), and (13, 15) pixels. In this case, the (5, 3), (5, 7), (9, 1), (9, 9), (13, 3), and (13, 7) pixels may constitute one hexagonal system.

Referring to FIG. 4B, the reference block includes 48×48 pixels. For example, similarly to the case illustrated in FIG. 4A, in the case of first hexagonal system sampling, a 12×12 sample reference block SRB may be generated by sampling (1, 1), (1, 5), (1, 9), (1, 13), (1, 17) . . . (1, 45) . . . (5, 3), (5, 7), (5, 11), (5, 15), (5, 19) . . . (5,47) . . . (9, 1), (9, 5), (9, 9), (9, 13), (9, 17) . . . (9,45) . . . (13, 3), (13, 7), (13, 11), (13, 15), (13, 19) . . . (13,47) . . . pixels.

Figure 5A:
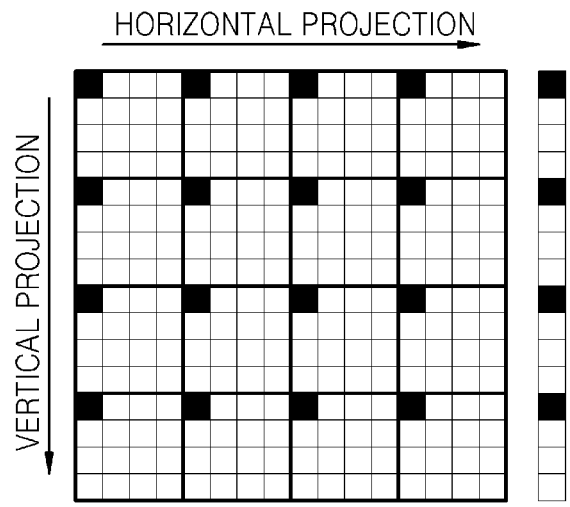
FIGS. 5A to 5C are diagrams illustrating orthogonal system sampling, first hexagonal system sampling, and second hexagonal system sampling, respectively, according to example embodiments of the present inventive concepts.
Figure 5B:
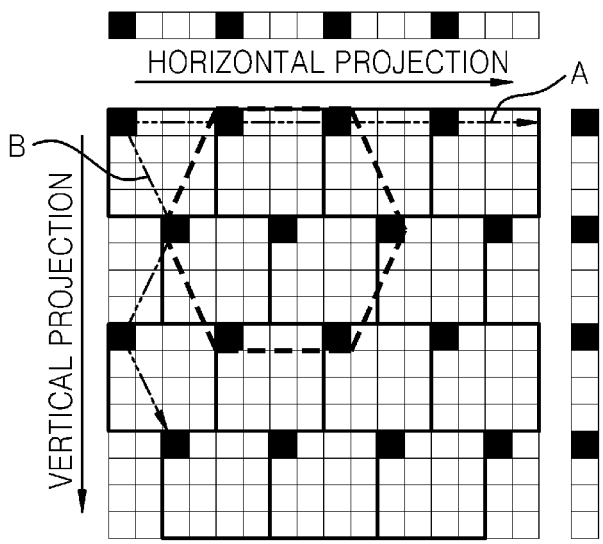
Figure 5C:
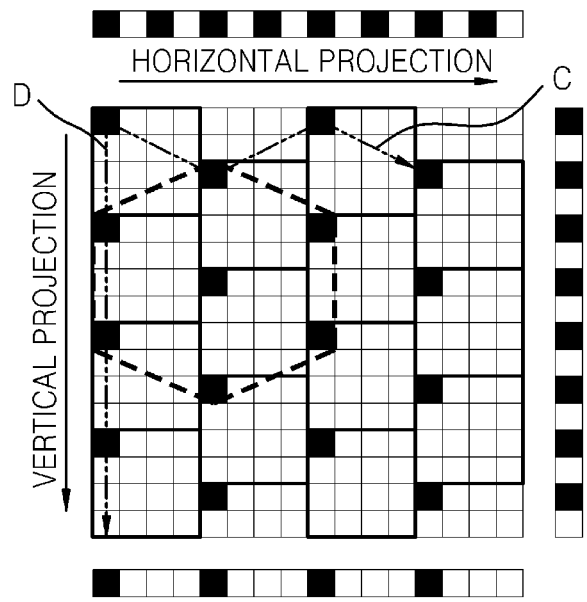

FIGS. 5A to 5C are diagrams illustrating orthogonal system sampling, first hexagonal system sampling, and second hexagonal system sampling, respectively.

Referring to FIG. 5A, when orthogonal system sampling is performed on a block including 16×16 pixels, it is seen that both the horizontal direction and the vertical direction are sampled at the rate of 4:1. That is, when the sampled pixels are projected in the horizontal direction, 1 out of 4 pixels is sampled. In addition, when the sampled pixels are projected in the vertical direction, 1 out of 4 pixels is sampled.

Referring to FIG. 5B, when first hexagonal system sampling is performed on a block including 16×16 pixels, it is seen that the vertical direction is sampled at the rate of 4:1, whereas the horizontal direction is sampled at the rate of 2:1. In this case, it is seen that a connecting line of the sampled pixels is a straight line A in the horizontal direction and is a zigzag line B in the vertical direction. That is, when the sampled pixels are projected in the horizontal direction, 1 out of 4 pixels is sampled. In addition, when the sampled pixels are projected in the vertical direction, 1 out of 2 pixels is sampled.

Referring to FIG. 5C, when second hexagonal system sampling is performed on a block including 16×16 pixels, it is seen that the horizontal direction is sampled at the rate of 4:1, whereas the vertical direction is sampled at the rate of 2:1. In this case, it is seen that a connecting line of the sampled pixels is a straight line D in the vertical direction and is a zigzag line C in the horizontal direction. That is, when the sampled pixels are projected in the horizontal direction, 1 out of 2 pixels is sampled. In addition, when the sampled pixels are projected in the vertical direction, 1 out of 4 pixels is sampled.

However, the sampling rate in FIGS. 5A to 5C is merely illustrative and is not intended to limit the scope of the present inventive concepts.

In the frame motion estimation method according to the example embodiments of the present inventive concepts, when one pixel is sampled for each block constituted by N pixels (N is a natural number) in width and M pixels (M is a natural number) in height and the sampled pixels are projected in a horizontal direction, at least two pixels may be sampled for every M pixels.

In addition, in the frame motion estimation method according to the example embodiments of the inventive concepts, when one pixel is sampled for each block constituted by N pixels (N is a natural number) in width and M pixels (M is a natural number) in height and the sampled pixels are projected in a vertical direction, at least two pixels may be sampled for every N pixels.

In addition, in the frame motion estimation method according to the example embodiments of the inventive concepts, when one pixel is sampled for each block constituted by 2K pixels (K is a natural number) in width and height and the sampled pixels are projected in at least one of the horizontal and vertical directions, one pixel may be sampled for every K pixels.

Referring back to FIG. 3, the sampling unit 120 may perform hexagonal system sampling, as described in connection with FIGS. 4A-B and FIGS. 5A-C, on the source block SB and the reference block RB to generate the sample source block SSB and the sample reference block SRB. The sampling unit 120 may perform the hexagonal system sampling by using the method described with reference to FIG. 5B or FIG. 5C. The sampling unit 120 may transmit sample information of source block ISSB and sample information of reference block ISRB to the first comparison unit 140.

The first comparison unit 140 may compare pixel values of the sample source block SSB and the sample reference block SRB and determine a first matching region in the reference block RB. Specifically, the first comparison unit 140 matches a first pixel of the sample source block SSB with each pixel of the sample reference block SRB, and calculates a sum of absolute differences (SAD) between the respective pixel values with respect to a portion where the sample source block SSB and the sample reference block SRB overlap each other. The first comparison unit 140 searches for a pixel having a minimum SAD between the pixel values with respect to the portion where the sample source block SSB and the sample reference block SRB overlap each other, in the pixels of the sample reference block.

FIGS. 6A to 6F are diagrams illustrating a process of determining the first matching region using the first comparison unit 140.

Figure 6A:
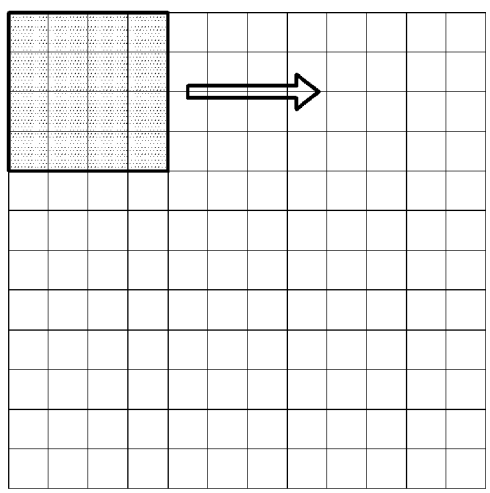
FIGS. 6A to 6F are diagrams illustrating a process of determining a first matching region using a first comparison unit according to an example embodiment of the present inventive concepts.

Referring to FIG. 6A, the first comparison unit 140 matches pixels of a 4×4 sample source block with pixels of a sample reference block, and calculates a SAD[1] with respect to overlapping portions.

Figure 6B:
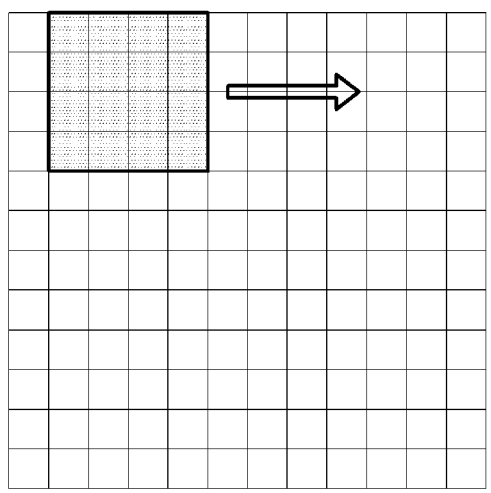

Referring to FIG. 6B, the first comparison unit 140 matches pixels of a 4×4 sample source block with pixels of a sample reference block, and calculates a SAD[2] with respect to overlapping portions.

Figure 6C:
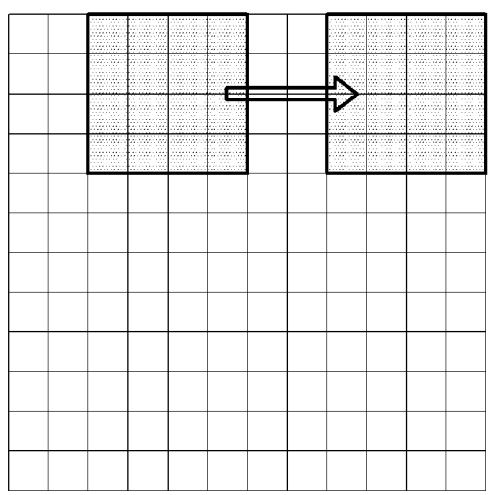

Referring to FIG. 6C, the first comparison unit 140 matches pixels of a 4×4 sample source block with pixels of a sample reference block, and calculates a SAD[3] to a SAD[9] with respect to overlapping portions.

Figure 6D:
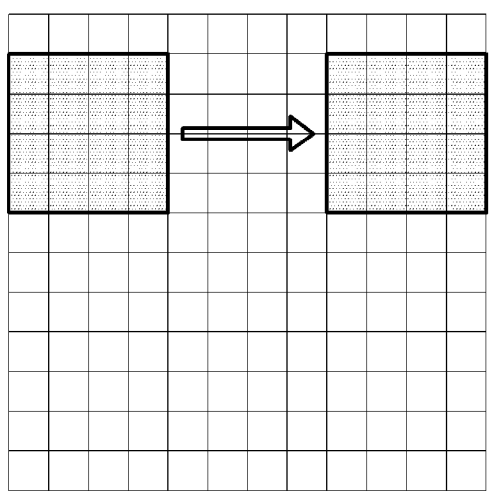

Referring to FIG. 6D, the first comparison unit 140 matches pixels of a 4×4 sample source block with pixels of a sample reference block, and calculates a SAD[10] to a SAD[18] with respect to overlapping portions.

Figure 6E:
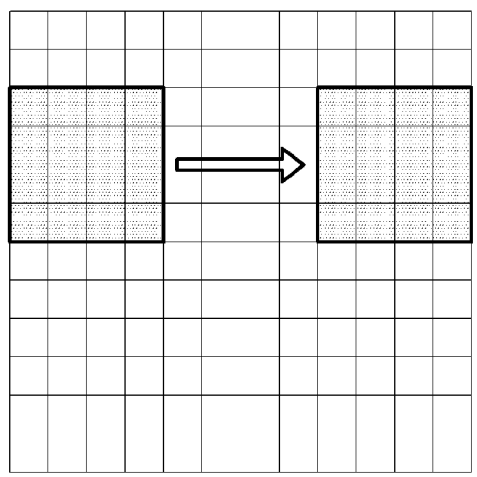

Referring to FIG. 6E, the first comparison unit 140 matches pixels of a 4×4 sample source block with pixels of a sample reference block, and calculates a SAD[19] to a SAD[27] with respect to overlapping portions.

Figure 6F:
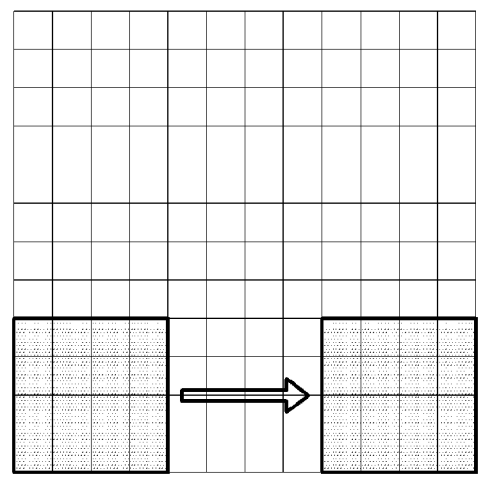

Referring to FIG. 6F, the first comparison unit 140 matches pixels of a 4×4 sample source block with pixels of a sample reference block, and calculates a SAD[73] to a SAD[81] with respect to overlapping portions.

The first comparison unit 140 compares the SAD[1] to the SAD[81] with each other, and determines the minimum value. For example, when the SAD[10] has a minimum value, the first comparison unit 140 may extract the pixel of the second row and the first column of the sample source block as the pixel having the minimum SAD. In addition, the first comparison unit 140 may determine a matching region of the reference block corresponding to the pixel of the second row and the first column to be a first matching region MA_1.

Referring back to FIG. 3, the first comparison unit 140 may transmit first information of the matching region IMA_1 to the second comparison unit 130.

The second comparison unit 130 may receive the first information of the matching region IMA_1, the information of the source block ISB, and the information of the reference block IRB. The second comparison unit 130 may compare pixel values of the periphery of the first matching region MA_1 included in the reference block RB and the source block SB, and may determine a second matching region in the reference block RB.

Specifically, the second comparison unit 130 matches a second pixel of the source block with each pixel of the reference block in a region within a fixed distance from the first matching region, and calculates the SAD between the respective pixel values with respect to a portion where the source block and the reference block overlap each other. The second comparison unit 130 searches for a pixel having a minimum SAD between the pixel values with respect to the portion where the source block and the reference block overlap each other, in the pixels of the reference block.

In addition, the second comparison unit 130 may determine a region of the reference block which corresponds to a pixel of the reference block which has the minimum SAD, to be a second matching region MA_2. The second comparison unit 130 may transmit second information of matching region IMA_2 to the motion vector calculator 150.

The motion vector calculator 150 may determine a motion vector between the reference block RB and the source block SB through the second information of matching region IMA_2. Specifically, the motion vector calculator 150 may determine the motion vector by determining that an object of the second matching region of the reference block RB included in the reference frame moves to the source block SB included in the source frame. The motion vector calculator 150 may generate the information of motion vector IMV.

Figure 7:
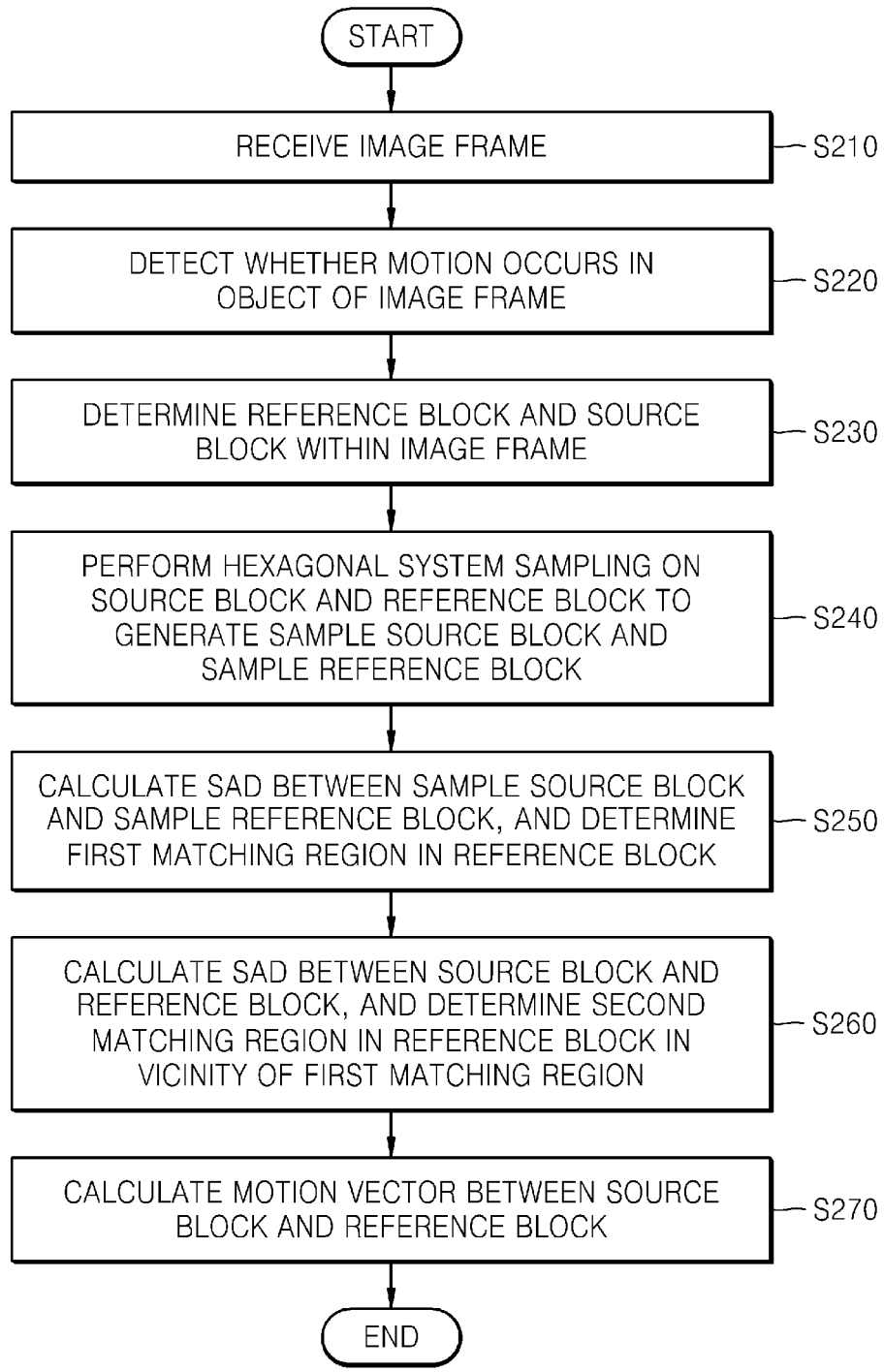
FIG. 7 is a flowchart of a method of estimating a motion of an image frame, according to an example embodiment of the present inventive concepts.

FIG. 7 is a flowchart of a method of encoding an image frame by an image frame motion estimation device 10, according to an example embodiment of the present inventive concepts.

Referring to FIGS. 2, 3, and 7, the image frame motion estimation device 10 receives an image frame F (operation S210). The motion vector estimation device 100 may receive image frame F and may generate information of the motion vector IMV and information of the source frame ISF. The motion detecting unit 110 of the motion vector estimation device 100 detects whether a motion occurs in an object of the image frame F (operation S220).

The motion detecting unit 110 determines the reference block RB and the source block SB within the image frame F (operation S230). The sampling unit 120 performs hexagonal system sampling on the source block SB and the reference block RB to generate a sample source block and a sample reference block (operation S240). The first comparison unit 140 calculates a SAD between the sample source block and the sample reference block, and determines a first matching region MA_1 in the reference block RB (operation S250).

The second comparison unit 130 calculates a SAD between the source block SB and the reference block RB in the vicinity of the first matching region MA_1, and determines a second matching region MA_2 in the reference block RB (operation S260). The motion vector calculator 150 calculates a motion vector IMV between the source block SB and the reference block RB with reference to the second matching region MA_2 (operation S270).

Thus, in the image frame motion estimation method according to the example embodiment of the present inventive concepts, a relatively small number of sampling operations may be performed through hexagonal system sampling, and a high sampling frequency may be obtained in the horizontal or vertical direction.

Figure 8:
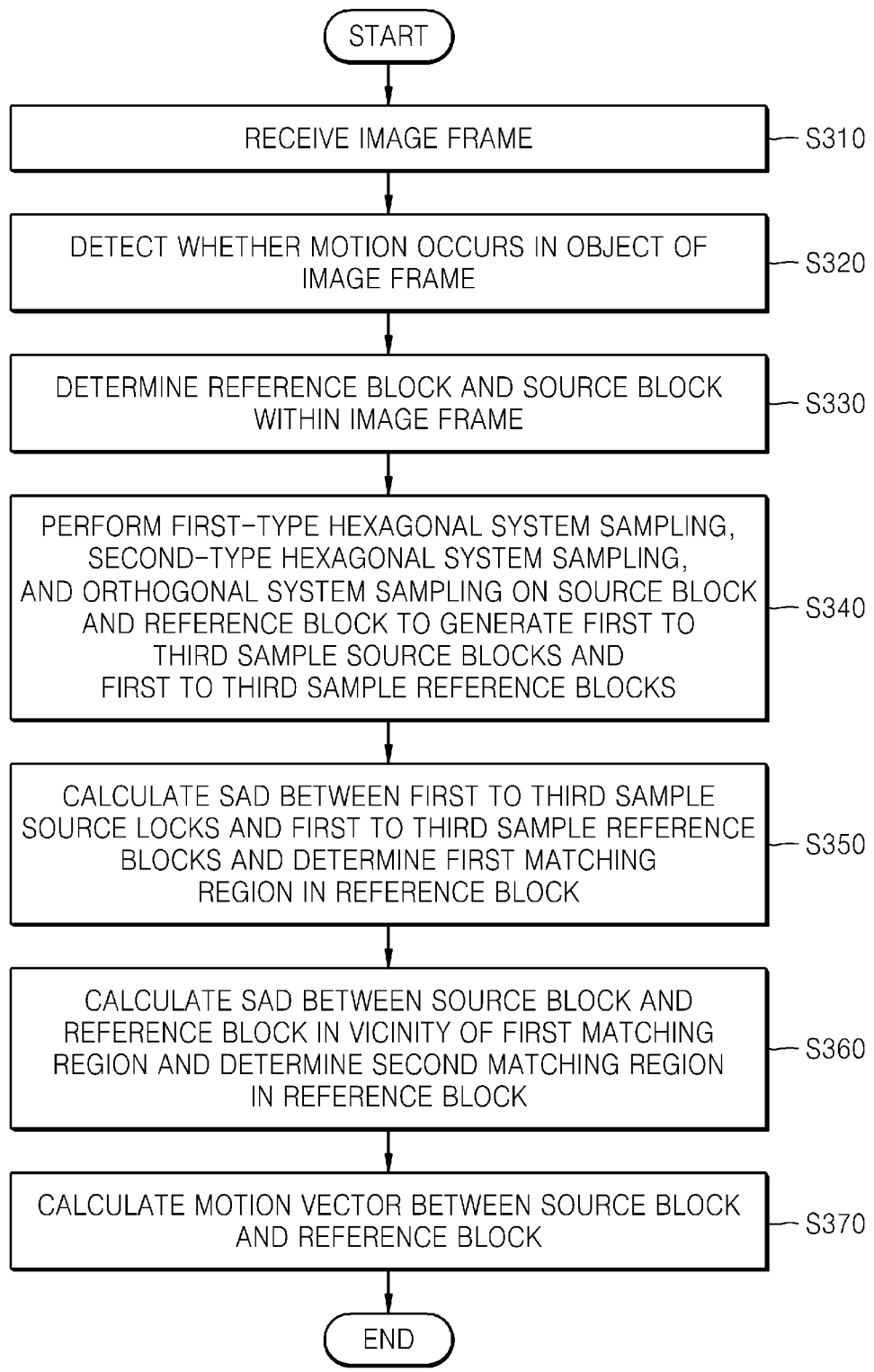
FIG. 8 is a flowchart of a method of estimating a motion of an image frame, according to an example embodiment of the present inventive concepts.

FIG. 8 is a flowchart of a method of encoding an image frame using the image frame motion estimation device 10, according to an example embodiment of the present inventive concepts.

The method of encoding an image frame of FIG. 8 is the same as the method of encoding an image frame of FIG. 7, except for an operation of determining a first matching region.

Figure 9:
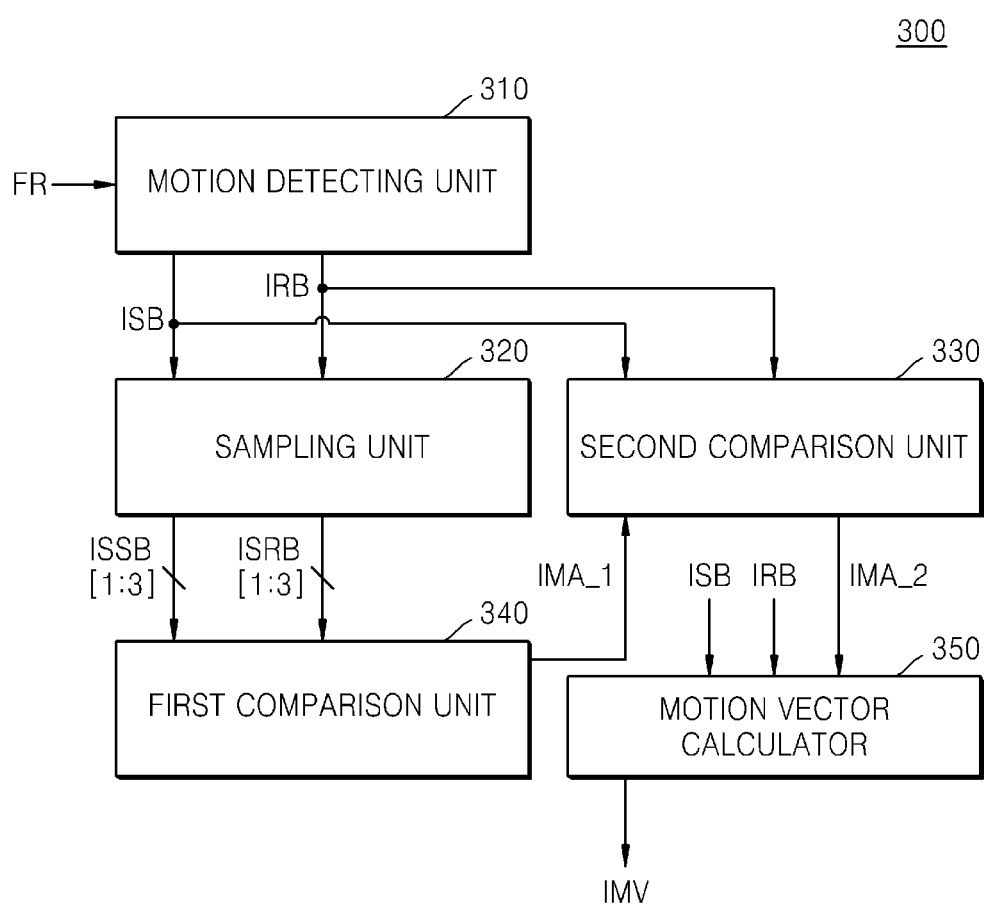
FIG. 9 is a block diagram of a motion vector estimation device, according to an example embodiment of the present inventive concepts.

FIG. 9 is a block diagram of a motion vector estimation device 300 according to an example embodiment of the present inventive concepts, for example, using the method of encoding an image frame of FIG. 8.

Referring to FIG. 9, a motion detecting unit 310, a first comparison unit 340, a second comparison unit 330, and a motion vector calculator 350 of the motion vector estimation device 300 are configured in the same manner as those of the motion vector estimation device 100 of FIG. 3. That is the motion detecting unit 310, the first comparison unit 340, the second comparison unit 330, and the motion vector calculator 350 of the motion vector estimation device 300 are configured in the same manner as the motion detecting unit 110, the first comparison unit 140, the second comparison unit 130, and the motion vector calculator 150, respectively, of the motion vector estimation device 100 of FIG. 3

Referring to FIGS. 8 and 9, a sampling unit 320 performs first-type hexagonal system sampling, second-type hexagonal system sampling, and orthogonal system sampling on a source block and a reference block to generate first to third sample source blocks and first to third sample reference blocks (operation S340). The sampling unit 320 may transmit first to third information of the first to third sample source blocks ISSB [1;3] and first to third information of the first to third sample reference blocks ISRB[1;3] to the first comparison unit 340.

Specifically, the sampling unit 320 may perform the hexagonal system sampling as described in connection with FIG. 5B on the source block and the reference block to generate a first sample source block and a first sample reference block. In addition, the sampling unit 320 may perform the hexagonal system sampling as described in connection with FIG. 5C on the source block and the reference block to generate a second sample source block and a second sample reference block. In addition, the sampling unit 320 may perform the orthogonal system sampling as described in connection FIG. 5A on the source block and the reference block to generate a third sample source block and a third sample reference block.

The first comparison unit 340 may calculate a SAD between the first to third sample source blocks and the first to third sample reference blocks and determine a first matching region in the reference block (operation S350).

Specifically, the first comparison unit 340 matches a first pixel of the first sample source block with each pixel of the first sample reference block and calculates a SAD between pixel values with respect to a portion where the first sample source block and the first sample reference block overlap each other. The first comparison unit 340 searches for a pixel X having a minimum SAD between the pixel values with respect to the portion where the first sample source block and the first sample reference block overlap each other, in the pixels of the first sample reference block.

In addition, the first comparison unit 340 matches a first pixel of the second sample source block with each pixel of the second sample reference block, and calculates a SAD between pixel values with a portion where the second sample source block and the second sample reference block overlap each other. The first comparison unit 340 searches for a pixel Y having a minimum SAD between the pixel values with respect to the portion where the second sample source block and the second sample reference block overlap each other, in the pixels of the second sample reference block.

In addition, the first comparison unit 340 matches a first pixel of the third sample source block with each pixel of the third sample reference block, and calculates a SAD between pixel values with respect to a portion where the third sample source block and the third sample reference block overlap each other. The first comparison unit 340 searches for a pixel Z having a minimum SAD between the pixel values with respect to the portion where the third sample source block and the third sample reference block overlap each other, in the pixels of the third sample reference block.

The first comparison unit 340 determines a pixel having a minimum SAD between the pixel values in the pixel X, the pixel Y, and the pixel Z. For example, when the pixel X has a minimum SAD, the motion vector calculator 350 determines a motion vector on the basis of the first sample source block and the first sample reference block that are determined through the hexagonal system sampling as described in connection with FIG. 5B.

Accordingly, in the image frame motion estimation method according to the example embodiments of FIGS. 8 and 9 of the present inventive concepts, a motion vector is determined through sampling optimized for a source frame in a plurality of pieces of sampling, and, thus, the size of the bit stream BS may be minimized.

Figure 10:
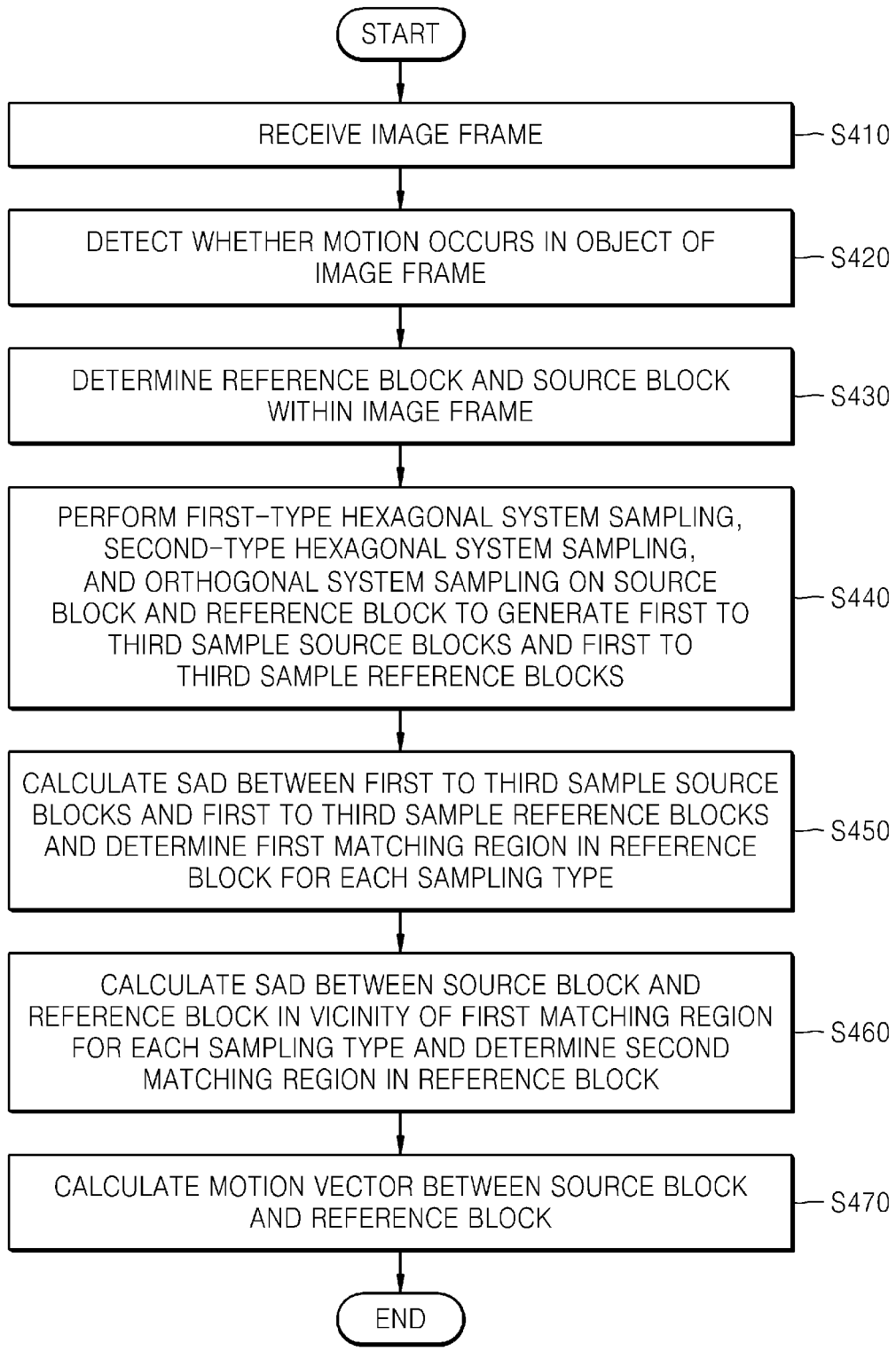
FIG. 10 is a flowchart of a method of estimating a motion of an image frame, according to an example embodiment of the present inventive concepts.

FIG. 10 is a flowchart of a method of encoding an image frame using an image frame motion estimation device, according to an example embodiment of the present inventive concepts.

The method of encoding an image frame of FIG. 10 is the same as the method of encoding an image frame of FIG. 8, except for operations of determining a first matching region (operations S450 and S460).

Figure 11:
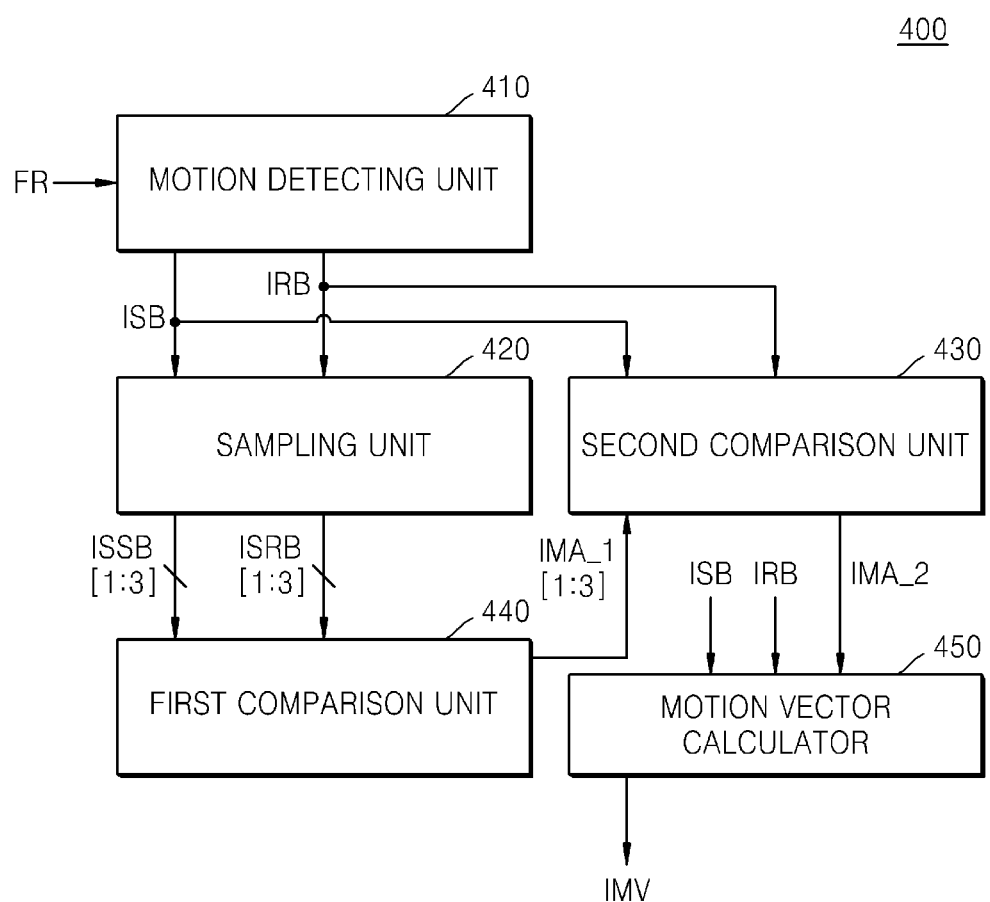
FIG. 11 is a block diagram of a motion vector estimation device according to an example embodiment of the inventive concepts.

FIG. 11 is a block diagram of a motion vector estimation device 400 according to an example embodiment of the present inventive concepts, for example, using the method of encoding an image frame of FIG. 10.

Referring to FIG. 11, a motion detecting unit 410, a sampling unit 420, and a motion vector calculator 450 of the motion vector estimation device 400 are configured in the same manner as those of the motion vector estimation device 300 of FIG. 9. That is, the motion detecting unit 410, the sampling unit 420, and the motion vector calculator 450 of the motion vector estimation device 400 are configured in the same manner as the motion detecting unit 310, the sampling unit 320, and the motion vector calculator 350 of the motion vector estimation device 300 of FIG. 9.

Referring to FIGS. 10 and 11, the sampling unit 420 performs first-type hexagonal system sampling, second-type hexagonal system sampling, and orthogonal system sampling on a source block and a reference block to generate first to third sample source blocks and first to third sample reference blocks (operation S440). The sampling unit 420 may transmit first to third information of the first to third sample source blocks ISSB [1;3] and first to third information of the first to third sample reference blocks ISRB[1;3] to a first comparison unit 440.

The first comparison unit 440 may calculate a SAD between the first to third sample source blocks and the first to third sample reference blocks for each sampling type and determine a first matching region in the reference block for each sampling type (operation S450).

Specifically, the first comparison unit 440 matches a first pixel of the first sample source block with each pixel of the first sample reference block, and calculates a SAD between pixel values with respect to a portion where the first sample source block and the first sample reference block overlap each other. The first comparison unit 440 searches for a pixel X having a minimum SAD between the pixel values with respect to the portion where the first sample source block and the first sample reference block overlap each other, in the pixels of the first sample reference block.

In addition, the first comparison unit 440 matches a first pixel of the second sample source block with each pixel of the second sample reference block, and calculates a SAD between pixel values with respect to a portion where the second sample source block and the second sample reference block overlap each other. The first comparison unit 440 searches for a pixel Y having a minimum SAD between the pixel values with respect to the portion where the second sample source block and the second sample reference block overlap each other, in the pixels of the second sample reference block.

In addition, the first comparison unit 440 matches a first pixel of the third sample source block with each pixel of the third sample reference block, and calculates a SAD between pixel values with respect to a portion where the third sample source block and the third sample reference block overlap each other. The first comparison unit 440 searches for a pixel Z having a minimum SAD between the pixel values with respect to the portion where the third sample source block and the third sample reference block overlap each other, in the pixels of the third sample reference block.

The first comparison unit 440 may transmit first information of matching region IMA_1[1;3] determined for each sampling type, namely, the first-type hexagonal sampling, the second-type hexagonal sampling, and the orthogonal system sampling, to the second comparison unit 430.

The second comparison unit 430 may calculate a SAD between the source block and reference block in the vicinity of the first matching region for each sampling type and determine a second matching region in the reference block (operation S460).

Specifically, the second comparison unit 430 matches a first pixel of the first source block with each pixel of the first reference block in a region within in fixed second distance from first matching for the first-type hexagonal sampling, and calculates a SAD between pixel values with respect to a portion where the first source block and the first reference block overlap each other. The second comparison unit 430 searches for a pixel M having a minimum SAD between the pixel values with respect to the portion where the first source block and the first reference block overlap each other, in the pixels of the first reference block.

In addition, the second comparison unit 430 matches a first pixel of the second source block with each pixel of the second reference block in a region within in fixed second distance from first matching for the second-type hexagonal sampling, and calculates a SAD between respective pixel values with respect to a portion where the second source block and the second reference block overlap each other. The second comparison unit 440 searches for a pixel N having a minimum SAD between the pixel values with respect to the portion where the second source block and the second reference block overlap each other, in the pixels of the second reference block.

In addition, the second comparison unit 430 matches a first pixel of the third source block with each pixel of the third reference block in a region within in fixed second distance from first matching for the orthogonal sampling, and calculates a SAD between pixel values with respect to a portion where the third source block and the third reference block overlap each other. The second comparison unit 430 searches for a pixel L having a minimum SAD between the pixel values with respect to the portion where the third source block and the third reference block overlap each other, in the pixels of the third reference block.

The second comparison unit 430 determines a pixel having a minimum SAD between the pixel values in the pixel M, the pixel N, and the pixel L. For example, when the pixel M has a minimum SAD, the motion vector calculator 450 determines a motion vector on the basis of the first source block and the first reference block that are determined through the hexagonal system sampling as described in connection with FIG. 5B.

Accordingly, in the image frame motion estimation method according to the example embodiments of FIGS. 10 and 11 of the present inventive concepts, a motion vector is determined through sampling optimized for a source frame in a plurality of pieces of sampling, and, thus, the size of the bit stream BS may be minimized.

Figure 12:
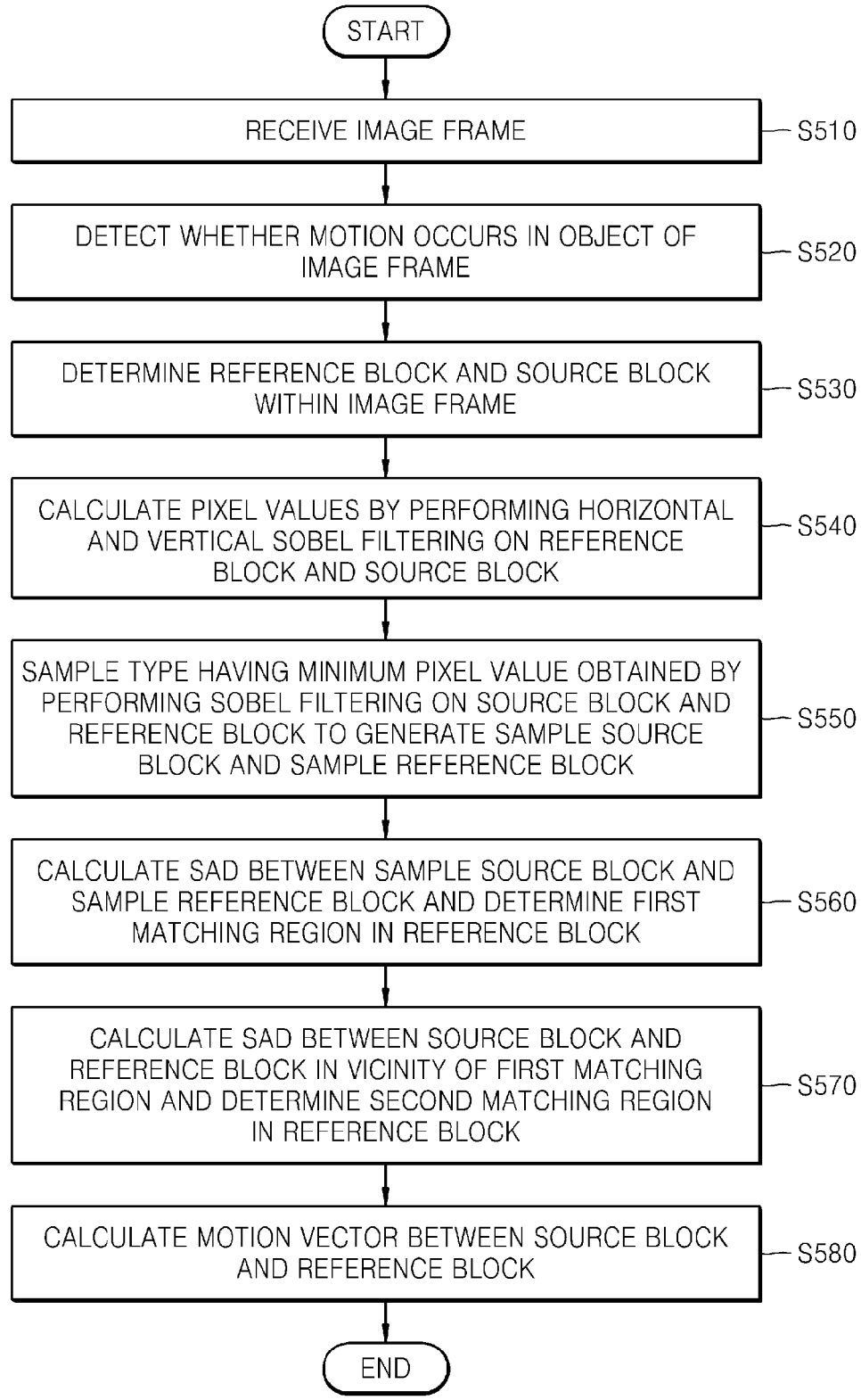
FIG. 12 is a flowchart of a method of estimating a motion of an image frame, according to an example embodiment of the present inventive concepts.

FIG. 12 is a flowchart of a method of encoding an image frame, according to an example embodiment of the present inventive concepts.

The method of encoding an image frame of FIG. 12 is the same as the method of encoding an image frame of FIG. 7, except for operations of determining a first matching region (operations S540 and S550).

Figure 13:
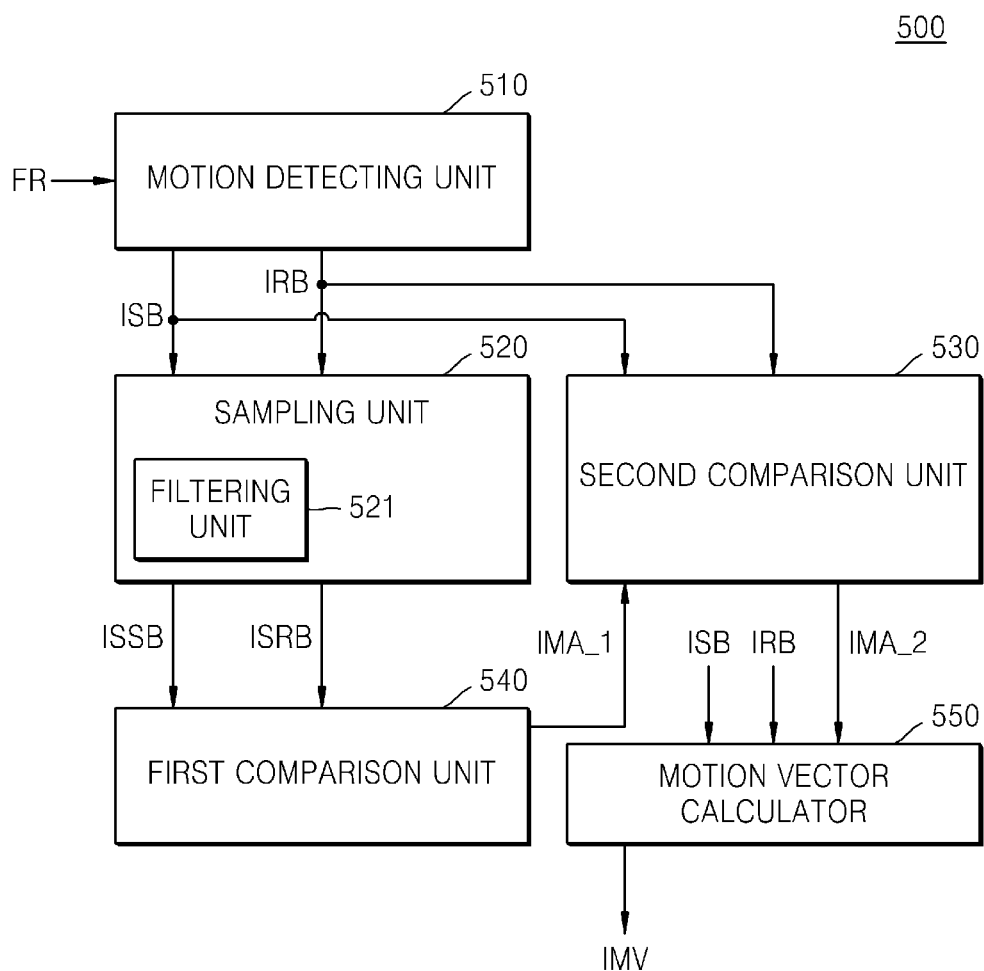
FIG. 13 is a block diagram of a motion vector estimation device according to an example embodiment of the present inventive concepts.
Figure 14A:
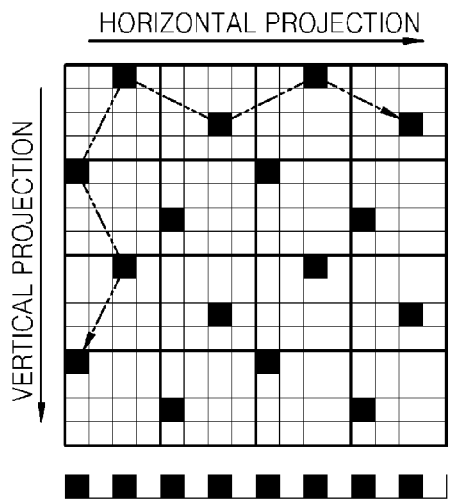
FIGS. 14A to 14D are diagrams illustrating sampling according to various example embodiments of the present inventive concepts.
Figure 14B:
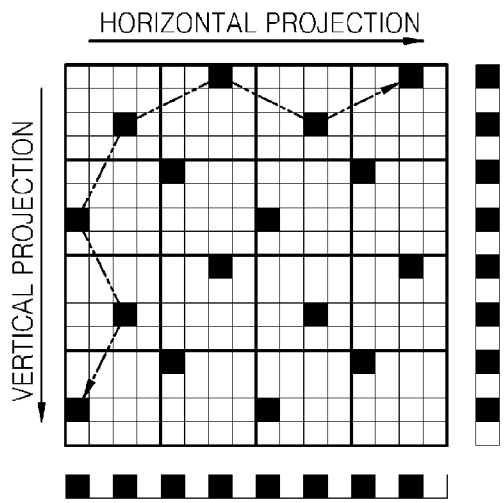
Figure 14C:
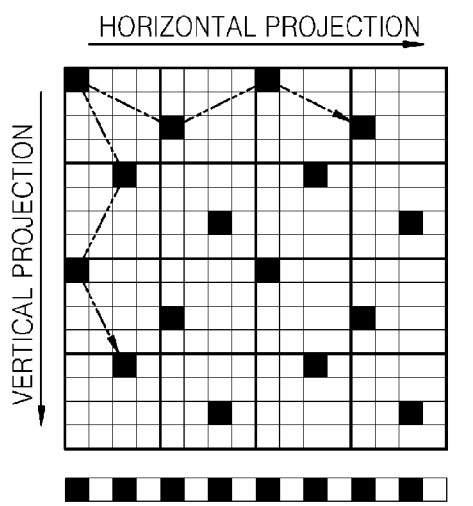
Figure 14D:
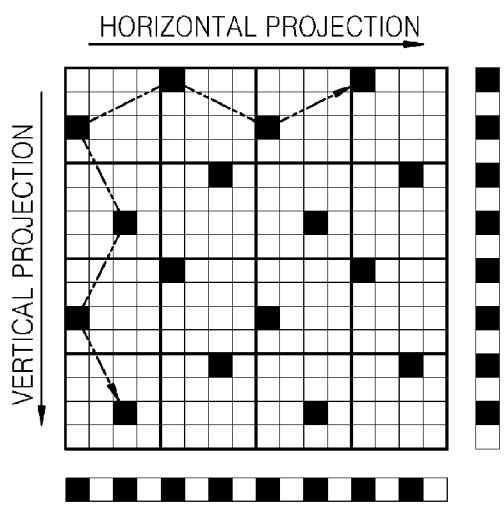

FIG. 13 is a block diagram of a motion vector estimation device 500 according to an example embodiment of the present inventive concepts, for example, using the method of encoding an image frame of FIG. 12.

Referring to FIG. 13, a motion detecting unit 510, a first comparison unit 540, a second comparison unit 530, and a motion vector calculator 550 of the motion vector estimation device 500 are configured in the same manner as those of the motion vector estimation device 100 of FIG. 3. That is, the motion detecting unit 510, the first comparison unit 540, the second comparison unit 530, and the motion vector calculator 550 of the motion vector estimation device 500 are configured in the same manner as the motion detecting unit 110, the first comparison unit 140, the second comparison unit 130, and the motion vector calculator 150 of the motion vector estimation device 100 of FIG. 3. A sampling unit 520 included in the motion vector estimation device 500 further includes a filtering unit 521.

Referring to FIGS. 12 and 13, the filtering unit 521 calculates a pixel value by performing horizontal and vertical sobel filtering on a reference block and a source block (operation S540).

For example, the filtering unit 521 performs the horizontal sobel filtering on the reference block and the source block, and calculates a sum (PH) of filtered pixel values. In addition, the filtering unit 521 performs the vertical sobel filtering on the reference block and the source block, and calculates a sum (PV) of filtered pixel values.

The sampling unit 520 samples a type having a minimum pixel value obtained by performing sobel filtering on the source block and the reference block to generate a sample source block and a sample reference block (operation S550).

For example, when the sum PH of the filtered pixel values is greater than the sum PV of filtered pixel values, the sampling unit 520 may perform the filtering of the type illustrated in FIG. 5B on the source block and the reference block. In addition, when the sum PV of filtered pixel values is greater than the sum PH of filtered pixel values, the sampling unit 520 may perform the filtering of the type illustrated in FIG. 5C on the source block and the reference block. In addition, when the sum PV of filtered pixel values and the sum PH of filtered pixel values are equal to each other, the sampling unit 520 may perform the filtering of the type illustrated in FIG. 5A on the source block and the reference block.

Accordingly, in the image frame motion estimation method according to the example embodiments of FIGS. 12 and 13 of the present inventive concepts, a sampling type is determined through a filtered pixel value and sampling is performed in accordance with the selected sampling type, so that a relatively small number of sampling operations may be performed and a high sampling frequency may be obtained.

FIGS. 14A to 14D are diagrams illustrating sampling according to various example embodiments of the present inventive concepts.

FIGS. 14A-D are diagrams illustrating a third-type sampling. Referring to FIGS. 14A to 14D, when third-type sampling is performed on a block including 16×16 pixels, it is seen that both a horizontal direction and a vertical direction are sampled at the rate of 2:1. That is, when the sampled pixels are projected in the horizontal direction and the vertical direction, one out of two pixels is sampled. In this sampling method, a connecting line of the sampled pixels is a straight line in the horizontal direction and the vertical direction.

The third-type sampling illustrated in FIGS. 14A to 14D may replace the sampling methods illustrated in connection with FIG. 5B or FIG. 5C. For example, the first-type hexagonal system sampling, as illustrated in FIG. 5B, or the second-type hexagonal system sampling, s illustrated in FIG. 5C, of FIGS. 1, 7, 8, 10, and 12 may be replaced with the third-type sampling of FIGS. 14A-D.

In addition, the sampling rate in FIGS. 14A to 14D is merely illustrative and is not intended to limit the scope of the present inventive concepts. That is, when one pixel is sampled for each block constituted by 2N pixels (N is a natural number) in width and height and when a pixel sampled in at least one of the horizontal and vertical directions is projected, if only one pixel is sampled for every N pixels, the sampling rate may be included in the scope of the present inventive concepts.

Figure 15:
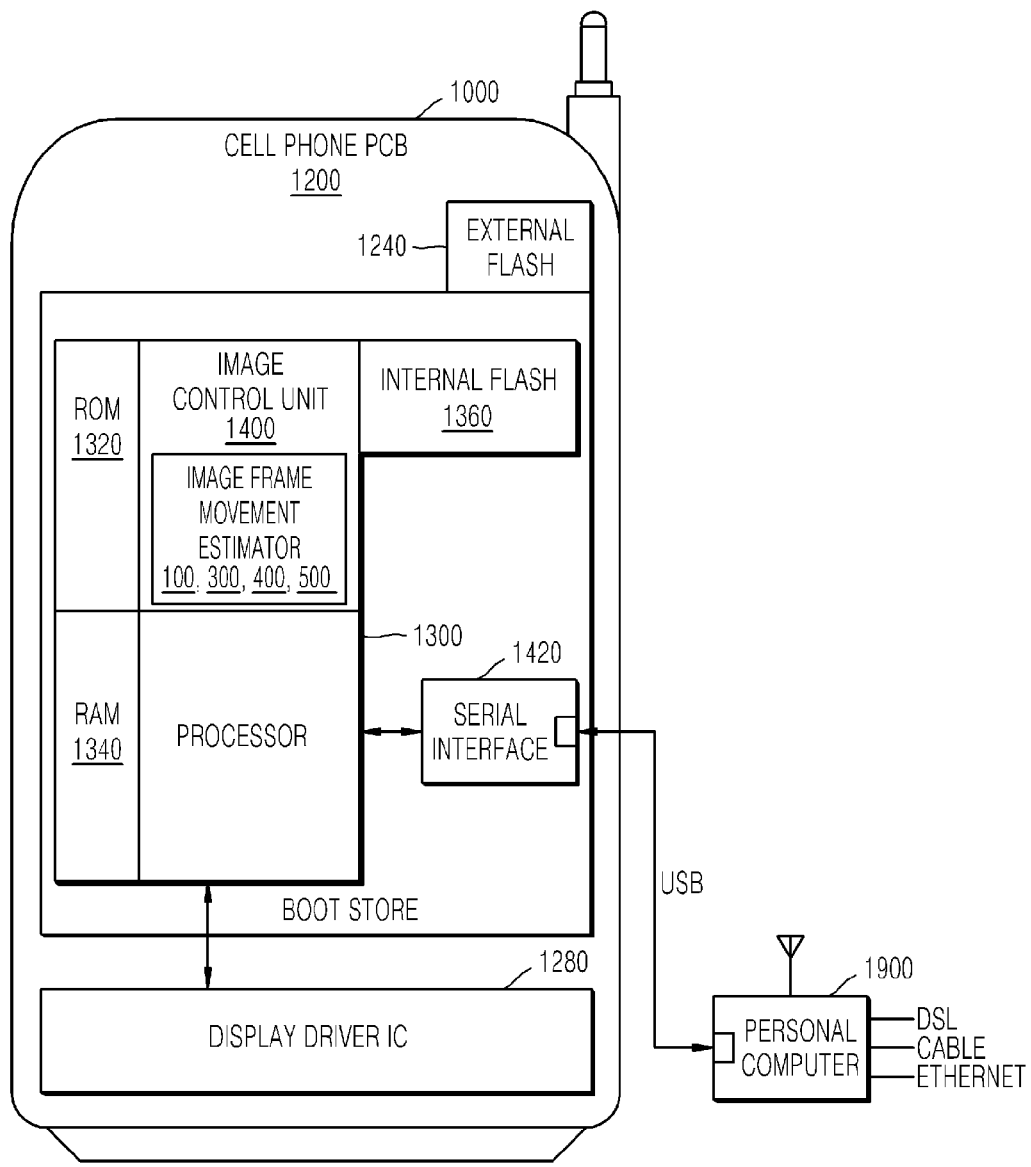
FIG. 15 is a block diagram of a mobile terminal according to an example embodiment of the present inventive concepts.

FIG. 15 is a block diagram of a mobile terminal 1000 according to an example embodiment of the present inventive concepts.

Referring to FIG. 15, the mobile terminal 1000 may include a cellphone PCB 1200 including an external flash memory 1240, a serial interface 1420, a processor 1300, and a display driver IC (DDI) 1280.

The serial interface 1420 may be, for example, a USB interface for updating or transmitting and receiving information between a personal computer 1900 and the mobile terminal 1000. The updating or transmitting and receiving of the information may be performed using a cellular modem, a WLAN, Bluetooth, another wired/wireless modem processor, or a physical layer circuit.

The processor 1300 may include read only memory (ROM) 1320, RAM 1340, an internal flash memory 1360, and an image control unit 1400. The image control unit 1400 of the processor 1300 may process image data and transmit the processed image data to the DDI 1280.

The image control unit 1400 may include any of the image frame motion estimation devices 100, 300, 400, and 500 illustrated in FIGS. 4, 9, 11, and 13, respectively, according to the example embodiments of the present inventive concepts. Accordingly, the processor 1300 embedded in the mobile terminal 1000 according to the example embodiment of the present inventive concepts may have a high sampling frequency with a relatively small number of sampling operations in transmitting an image data signal to the DDI 1280.

Figure 16:
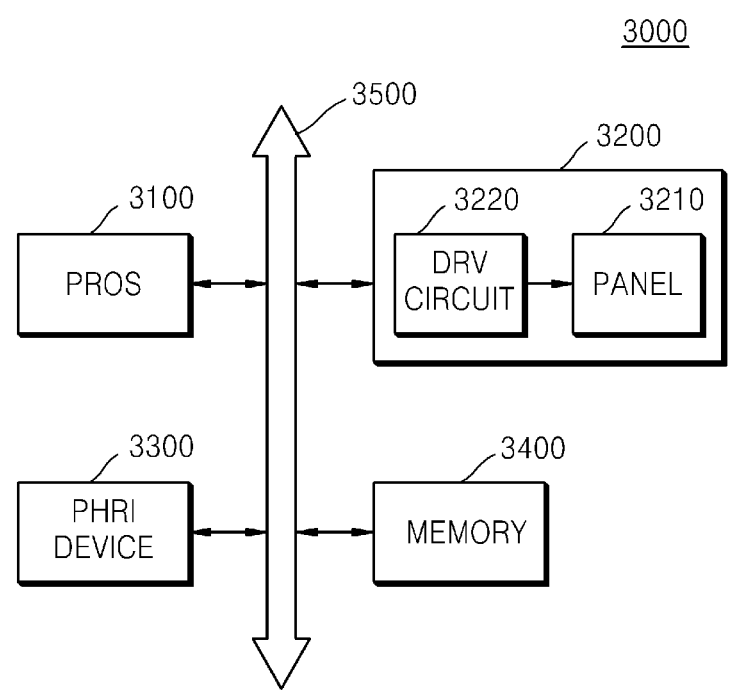
FIG. 16 is a block diagram of a display system according to an example embodiment of the present inventive concepts.

FIG. 16 is a block diagram of a display system 3000 according to an example embodiment of the present inventive concepts.

Referring to FIG. 16, the display system 3000 may include a processor 3100, a display device 3200, a peripheral device 3300, and a memory 3400 that are electrically connected to a system bus 3500.

The processor 3100 may control inputting and outputting of data of the peripheral device 3300, the memory 3400, and the display device 3200 and perform image processing on image data transmitted between elements.

The display device 3200 includes a panel 3210 and a driving circuit 3220, stores pieces of image data transmitted through the system bus 3500 in a frame memory included in the driving circuit 3220, and displays the image data on the panel 3210.

The processor 3100 or the display device 3200 may include any of the image frame motion estimation devices 100, 300, 400, and 500 of FIGS. 3, 9, 11, and 13, respectively. Accordingly, the processor 3100 or the display device 3200, which is embedded in the display system 3000 according to the example embodiments of the present inventive concepts may have a high sampling frequency with a relatively small number of sampling operations in transmitting and receiving an image data signal.

The peripheral device 3300 may be a device, such as a camera, a scanner, or a webcam, which converts a moving image or a still image into an electrical signal. Image data obtained using the peripheral device 3300 may be stored in the memory 3400, or may be displayed on a panel of the display device 3200 in real time.

The memory 3400 may include a volatile memory device such as a DRAM and/or a non-volatile memory device such as a flash memory. The memory 3400 may be constituted by a DRAM, a PRAM, a MRAM, a ReRAM, a FRAM, a NOR flash memory, a NAND flash memory, a fusion flash memory, for example, a memory in which an SRAM buffer, a NAND flash memory, and a NOR interface logic are combined with each other, or the like. The memory 3400 may store image data obtained from the peripheral device 3300 or store an image signal processed by the processor 3100.

The display system 3000 according to the example embodiment of the present inventive concepts may be included in a mobile electronic product such as a smartphone. However, the present inventive concepts are not limited thereto. The display system 3000 may be included in various types of electronic products that display an image.

FIG. 17 is a diagram of application examples of various electronic products to which a display device 4000 including any of the image frame motion estimation devices 100, 300, 400, and 500 of FIGS. 3, 9, 11 and 13, respectively, according to the example embodiments of the present inventive concepts is mounted.

The display device 4000 according to the present inventive concepts may be employed in various electronic products. For example, the display device 4000 may be employed in a cellphone 4100, and may be widely used in a TV 4200, an ATM 4300 which allows users to withdraw money from their bank account, an elevator 4400, a ticket issuing machine 4500 which is installed in a subway station, a PMP 4600, an e-book 4700, a navigation device 4800, and the like.

In addition, the image frame motion estimation method according to the example embodiment of the present inventive concepts may be applied to video encoding, noise reduction, and frame rate up conversion, and may be applied to a device and method for enhancing a compression rate of an image signal by predicting and calculating a motion of an image frame.

While the present inventive concepts have been particularly shown and described with reference to example embodiments thereof, it will be understood that various changes in form and details may be made therein without departing from the spirit and scope of the following claims.

What is claimed is:

1. An image frame motion estimation method comprising:
performing first sampling for generating a first sample source block by performing first-type sampling on pixels of a source block;
performing second sampling for generating a first sample reference block by performing first-type sampling on pixels of a reference block;
performing third sampling for generating a second sample source block by performing second-type sampling having a different directivity from the first-type sampling on pixels of the source block;
performing fourth sampling for generating a second sample reference block by performing second-type sampling on pixels of the reference block;
determining a first temporary matching region in the reference block by comparing pixel values of the first sample source block and the first sample reference block;
determining a second temporary matching region in the reference block by comparing pixel values of the second sample source block and the second sample reference block;
determining a first matching region from among the first temporary matching region and the second temporary matching region by comparing SAD value of the first temporary matching region and SAD value of the second temporary matching region; and
determining a second matching region corresponding to the source block by comparing pixel values of the source block and the reference block in a plurality of regions adjacent to the first matching region,
wherein where one pixel is sampled for each block constituted by N pixels (N is a natural number) in width and M pixels (M is a natural number) in height and the sampled pixels are projected in a horizontal direction, the first-type sampling and the second-type sampling causes at least two pixels to be sampled for every M pixels or where one pixel is sampled for each block constituted by N pixels (N is a natural number) in width and M pixels (M is a natural number) in height and the sampled pixels are projected in a vertical direction, the first-type sampling and the second-type sampling causes at least two pixels to be sampled for every N pixels.

2. The image frame motion estimation method of claim 1, further comprising determining a motion vector between the reference block and the source block through the second matching region.

3. The image frame motion estimation method of claim 1, wherein the determining of the first temporary matching region comprises:
matching a first pixel of the first sample source block with each pixel and obtaining a sum of differences between pixel values with respect to a portion where the first sample source block and the first sample reference block overlap each other; and
determining the first temporary matching region in the reference block having a minimum sum of differences between the pixel values, and
wherein the determining of the second temporary matching region comprises:
matching a second pixel of the second sample source block with each pixel and obtaining a sum of differences between pixel values with respect to a portion where the second sample source block and the second sample reference block overlap each other; and
determining the second temporary matching region in the reference block having a minimum sum of differences between the pixel values.

4. The image frame motion estimation method of claim 3, wherein the determining of the second matching region comprises:
matching a second pixel of the source block with each pixel of the reference block in a plurality of regions adjacent to the first matching region, and obtaining a sum of differences between pixel values with respect to a portion where the source block and the reference block overlap each other; and
determining a second matching region in the reference block having a minimum sum of differences between the pixel values.

5. The image frame motion estimation method of claim 1, wherein the first-type sampling is sampling in which a connecting line of sampled pixels is a straight line in a horizontal direction or a vertical direction.

6. The image frame motion estimation method of claim 5, wherein a sampling type of the first-type sampling is determined by comparing pixel values of the source block and the reference block which pass through a horizontal sobel filter and a vertical sobel filter.

7. The image frame motion estimation method of claim 6, wherein when a sum of the pixel values of the source block and the reference block which pass through the horizontal sobel filter is greater than a sum of the pixel values of the source block and the reference block which pass through the vertical sobel filter, the first-type sampling is a first-type hexagonal system sampling which is sampling in which a connecting line of sampled pixels is a straight line in a vertical direction, and
wherein when a sum of the pixel values of the source block and the reference block which pass through the horizontal sobel filter is less than a sum of the pixel values of the source block and the reference block which pass through the vertical sobel filter, the first-type sampling is a first-type hexagonal system sampling which is sampling in which a connecting line of sampled pixels is a straight line in a horizontal direction.

8. The image frame motion estimation method of claim 1, further comprising:

performing fifth sampling for generating a third sample source block by performing third-type sampling on pixels of the source block;

performing sixth sampling for generating a third sample reference block by performing third type sampling on pixels of the reference block; and determining a third temporary matching region in the reference block by comparing the third sample source block and the third sample reference block, wherein the determining of the first matching region compares the SAD value of the first temporary matching region, the SAD value of the second temporary matching region and SAD value of the third temporary matching region, and wherein the third-type sampling is orthogonal system sampling.

9. An image frame motion estimation device comprising:

a sampling unit for performing first-type sampling on pixels of a source block to generate a first sample source block, and performing first-type sampling on pixels of a reference block to generate a first sample reference block, performing second-type sampling having a different directivity from the first-type sampling on pixels of the source block to generate a second sample source block, and performing second-type sampling on pixels of the reference block to generate a second sample reference block;

a first comparison unit for determining a first temporary matching region in the reference block by comparing pixel values of the first sample source block and the first sample reference block, determining a second temporary matching region in the reference block by comparing pixel values of the second sample source block and the second sample reference block, and determining a first matching region from among the first temporary matching region and the second temporary matching region by comparing SAD value of the first temporary matching region and SAD value of the second temporary matching region; and a second comparison unit for determining a second matching region corresponding to the source block by comparing pixel values of the source block and the reference block in a plurality of regions adjacent to the first matching region, wherein where one pixel is sampled for each block constituted by N pixels (N is a natural number) in width and M pixels (M is a natural number) in height and the sampled pixels are projected in a horizontal direction, the first-type sampling and the second-type sampling causes at least two pixels to be sampled for every M pixels or where one pixel is sampled for each block constituted by N pixels (N is a natural number) in width and M pixels (M is a natural number) in height and the sampled pixels are projected in a vertical direction, the first-type sampling and the second-type sampling causes at least two pixels to be sampled for every N pixels.

10. The image frame motion estimation device of claim 9, further comprising a motion vector calculation unit for determining a motion vector between the reference block and the source block through the second matching region.

11. The image frame motion estimation device of claim 10, wherein the first comparison unit matches a first pixel of the first sample source block with each pixel, obtains a sum of differences between pixel values with respect to a portion where the first sample source block and the first sample reference block overlap each other, determines the first temporary matching region in the reference block having a minimum sum of differences between the pixel values, matches a second pixel of the second sample source block with each pixel, and obtains a sum of differences between pixel values with respect to a portion where the second sample source block and the second sample reference block overlap each other, and determines the second temporary matching region in the reference block having a minimum sum of differences between the pixel values.

12. The image frame motion estimation device of claim 10, wherein the second comparison unit matches a second pixel of the source block with each pixel of the reference block in a plurality of regions adjacent to the first matching region, and obtains a sum of differences between pixel values with respect to a portion where the source block and the reference block overlap each other; and wherein the second comparison unit determines a second matching region in the reference block having a minimum sum of differences between the pixel values.

13. The image frame motion estimation device of claim 10, wherein the sampling unit performs third type sampling from the first-type sampling on pixels of the source block to generate a third second sample source block, and performs third type sampling on pixels of the reference block to generate a third sample reference block, wherein the first comparison unit determines a third temporary matching region in the reference block by comparing the third sample source block and the third sample reference block, and wherein the first comparison unit determines the first matching region from among the first temporary matching region, the second temporary matching region and the third temporary matching region by comparing the SAD value of the first temporary matching region, the SAD value of the second temporary matching region and SAD value of the third temporary matching region, and wherein the third-type sampling is orthogonal system sampling.

* * * * *